US012650551B2

(12) United States Patent
Huang et al.

(10) Patent No.: US 12,650,551 B2
(45) Date of Patent: Jun. 9, 2026

(54) LIGHTING KEYBOARD, BACKLIGHT MODULE AND LIGHTING BOARD

(71) Applicant: DARFON ELECTRONICS CORP., Taoyuan City (TW)

(72) Inventors: Heng-Yi Huang, Taoyuan City (TW); Hsin-Cheng Ho, Taoyuan City (TW); Po-Yueh Chou, Taoyuan City (TW)

(73) Assignee: DARFON ELECTRONICS CORP., Taoyuan City (TW)

( * ) Notice: Subject to any disclaimer, the term of this patent is extended or adjusted under 35 U.S.C. 154(b) by 362 days.

(21) Appl. No.: 18/131,886

(22) Filed: Apr. 7, 2023

(65) Prior Publication Data

US 2023/0375773 A1     Nov. 23, 2023

Related U.S. Application Data

(63) Continuation-in-part of application No. 18/127,667, filed on Mar. 29, 2023, now abandoned.
(Continued)

(30) Foreign Application Priority Data

Apr. 8, 2022   (TW) ................................. 111113486
Mar. 9, 2023   (TW) ................................. 112108658
Mar. 20, 2023  (TW) ................................. 112110265

(51) Int. Cl.
*F21V 8/00*          (2006.01)
*H01H 9/18*          (2006.01)
(Continued)

(52) U.S. Cl.
CPC ........... *G02B 6/006* (2013.01); *G02B 6/0036* (2013.01); *H01H 9/18* (2013.01); *H01H 13/023* (2013.01); *H01H 13/83* (2013.01)

(58) Field of Classification Search
CPC ....... G02B 6/006; H01H 9/182; H01H 13/023
See application file for complete search history.

(56) References Cited

U.S. PATENT DOCUMENTS 2,953,668 A     9/1960  Bassett, Jr.
3,103,659 A     9/1963  Edwards
(Continued)

FOREIGN PATENT DOCUMENTS

CN          101514801 A     8/2009
CN          201758091 U     3/2011
(Continued)

OTHER PUBLICATIONS

Huang, the specification, including the claims, and drawings in the U.S. Appl. No. 18/127,667 , filed Mar. 29, 2023.
(Continued)

*Primary Examiner* — Sean P Gramling
(74) *Attorney, Agent, or Firm* — McClure, Qualey & Rodack, LLP

(57)     ABSTRACT

A lighting keyboard includes a backlight module and two rows of keyswitches. The backlight module includes a lighting board and a shielding sheet. The lighting board includes plural illuminants aligned into two rows to correspond to the two rows of keyswitches. The shielding sheet includes plural first outlet windows and plural first block patterns disposed within the first outlet windows respectively and form a first row pattern collectively. Each of the first block patterns respectively corresponds to one of the illuminant. The shielding sheet includes at least one second outlet window and plural second block patterns respectively disposed within the at least one second outlet window and formed a second row pattern collectively. Each of the plural second block patterns respectively correspond to one of the plural illuminants. A first window length of the entire contour of the plural first outlet windows is as long as a
(Continued)

second window length of the at least one second outlet window. And the first row pattern is not identical to the second row pattern, thereby providing consistent contour halos for the two rows of keyswitches.

15 Claims, 21 Drawing Sheets

Related U.S. Application Data

(60) Provisional application No. 63/439,160, filed on Jan. 16, 2023, provisional application No. 63/430,675, filed on Dec. 7, 2022, provisional application No. 63/378,261, filed on Oct. 4, 2022, provisional application No. 63/325,623, filed on Mar. 31, 2022.

(51) Int. Cl.
| | | |
|---|---|---|
| *H01H 13/02* | (2006.01) | |
| *H01H 13/83* | (2006.01) | |

(56) References Cited

U.S. PATENT DOCUMENTS

| | | | |
|---|---|---|---|
| 3,157,771 | A | 11/1964 | Roeser |
| 3,467,802 | A | 9/1969 | Martin |
| 3,639,745 | A | 2/1972 | Shiki |
| 4,346,275 | A | 8/1982 | Iwakiri |
| 4,535,396 | A | 8/1985 | Guthrie |
| 4,722,028 | A | 1/1988 | Brannon |
| 5,150,257 | A | 9/1992 | Mohabbatizadeh |
| 5,434,377 | A | 7/1995 | Martin |
| 6,210,010 | B1 | 4/2001 | Pontetti |
| 6,558,013 | B2 | 5/2003 | Tholin |
| 6,743,993 | B1 | 6/2004 | Clark |
| 9,040,856 | B2 | 5/2015 | Chen |
| 9,214,301 | B2 | 12/2015 | Chen |
| 9,299,515 | B2 | 3/2016 | Chen |
| 10,276,327 | B2 | 4/2019 | Chen |
| 10,586,664 | B2 | 3/2020 | Yeh |
| 11,036,306 | B2 | 6/2021 | Cheng |
| 11,257,638 | B2 | 2/2022 | Liang |
| 11,371,676 | B2 | 6/2022 | Huang |
| 11,409,373 | B2 | 8/2022 | Cheng |
| 11,443,907 | B2 | 9/2022 | Ho |
| 11,515,107 | B2 | 11/2022 | Chen |
| 11,538,641 | B2 | 12/2022 | Liang |
| 2009/0140891 | A1 | 6/2009 | Ragusa |
| 2011/0037730 | A1 | 2/2011 | Wang |
| 2012/0275193 | A1 | 11/2012 | Yoshida |
| 2014/0166457 | A1 | 6/2014 | Chen |
| 2017/0352504 | A1 | 12/2017 | Chen |
| 2019/0027326 | A1 | 1/2019 | Tsai |
| 2019/0369744 | A1 | 12/2019 | Wu |
| 2019/0371538 | A1 | 12/2019 | Huang |
| 2020/0402748 | A1 | 12/2020 | Cheng |
| 2023/0047235 | A1* | 2/2023 | Chen ..................... G06F 3/0213 |
| 2023/0317386 | A1 | 10/2023 | Huang |

FOREIGN PATENT DOCUMENTS

| | | | |
|---|---|---|---|
| CN | 203377146 | U | 1/2014 |
| CN | 104252987 | A | 12/2014 |
| CN | 106301323 | A | 1/2017 |
| CN | 106783308 | A | 5/2017 |
| CN | 110335775 | A | 10/2019 |
| CN | 214310968 | U | 9/2021 |
| CN | 113632249 | A | 11/2021 |
| JP | 2019-139728 | | 8/2019 |
| TW | I269993 | | 1/2007 |
| TW | M321552 | | 11/2007 |
| TW | M334393 | | 6/2008 |
| TW | 200945114 | | 11/2009 |
| TW | M395202 | U1 | 12/2010 |
| TW | I416565 | B | 11/2013 |
| TW | 201419343 | A | 5/2014 |
| TW | I494960 | B | 8/2015 |
| TW | I527075 | B | 3/2016 |
| TW | M548881 | U | 9/2017 |
| TW | I604484 | B | 11/2017 |
| TW | 201824318 | A | 7/2018 |
| TW | I632577 | B | 8/2018 |
| TW | I725894 | | 4/2021 |
| TW | 202143270 | A | 11/2021 |
| TW | 202211277 | A | 3/2022 |
| TW | I760181 | B | 4/2022 |

OTHER PUBLICATIONS

Liu, the specification, including the claims, and drawings in the U.S. Appl. No. 18/297,020 , filed Apr. 7, 2023.
Liu, the specification, including the claims, and drawings in the U.S. Appl. No. 18/128,235 , filed Mar. 30, 2023.
Chen, the specification, including the claims, and drawings in the U.S. Appl. No. 18/128,261 , filed Mar. 30, 2023.
Huang, the specification, including the claims, and drawings in the U.S. Appl. No. 18/330,342 , filed Jun. 6, 2023.
Chen, the specification, including the claims, and drawings in the U.S. Appl. No. 18/369,217 , filed Sep. 18, 2023.
Chen, the specification, including the claims, and drawings in the U.S. Appl. No. 18/368,538 , filed Sep. 14, 2023.
Liu, the specification, including the claims, and drawings in the U.S. Appl. No. 18/131,885 , filed Apr. 7, 2023.
Chen, the specification, including the claims, and drawings in the U.S. Appl. No. 18/376,818 , filed Oct. 4, 2023.

* cited by examiner

LIGHTING KEYBOARD, BACKLIGHT MODULE AND LIGHTING BOARD

CROSS REFERENCE TO RELATED APPLICATION

This application claims the benefit of U.S. Provisional Application No. 63/439,160, filed on Jan. 16, 2023. Further, this application is a continuation-in-part of U.S. application Ser. No. 18/127,667, filed on Mar. 29, 2023, which claims the benefit of U.S. Provisional Application No. 63/325,623, filed on Mar. 31, 2022, and claims the benefit of U.S. Provisional Application No. 63/430,675, filed on Dec. 7, 2022, and claims the benefit of U.S. Provisional Application No. 63/378,261, filed on Oct. 4, 2022. The contents of these applications are incorporated herein by reference.

BACKGROUND OF THE INVENTION

1. Field of the Invention

The invention relates to a lighting keyboard, a backlight module and a lighting board and, more particularly, to a lighting keyboard, a backlight module and a lighting board capable of improving the contour halo uniformity of plural areas and taking into account the halo uniformity of a single key in the areas.

2. Description of the Prior Art

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. Since the lighting keyboard of the prior art applies a low luminous light emitting diode (LED) to illuminate each of square keyswitches, the following problems may occur: 1) the main symbol above the LED is over-illuminated and the corner symbol(s) of keycap is too dark; 2) the surrounding outlet for keycap peripheral is inconsistent; and 3) the overall illuminating consistency on a single square keyswitch and on plural keyswitches are both not good.

SUMMARY OF THE INVENTION

According to an embodiment, the invention provides a backlight module configured to illuminate a plurality of key caps. The backlight module comprises a lighting board and a shielding sheet. The lighting board comprises a plurality of illuminants aligned into two rows. The shielding sheet comprises at least one first outlet window and a plurality of first block patterns disposed within the at least one first outlet window respectively. Each of the first block patterns respectively corresponds to one of the illuminants. The first block patterns form a first row pattern. The shielding sheet further comprises at least one second outlet window and a plurality of second block patterns disposed within the at least one second outlet window. Each of the second block patterns respectively corresponds to one of the illuminants. The second block patterns form a second row pattern. A first window length of an entire contour of the at least one first outlet window is as long as a second window length of the at least one second outlet window, and the first row pattern is different from the second row pattern.

In an embodiment, a plurality of first outlet windows have identical areas. In an embodiment, the second outlet window and each first outlet window have different areas. In an embodiment, short sides of the first outlet window and the second outlet window are equal in length. In an embodiment, the first row pattern defines a first frame pattern surrounding the at least one first outlet window, the second row pattern defines a second frame pattern surrounding the at least one second outlet window, and the first frame pattern is different from the second frame pattern. In an embodiment, the first row pattern defines a first frame pattern surrounding the at least one first outlet window, the second row pattern defines a second frame pattern surrounding the at least one second outlet window, and the first frame pattern is at least partially identical to the second frame pattern. In an embodiment, the backlight module comprises a plurality of first outlet windows, and two of a plurality of second outlet windows located at relatively outer sides are identical to two of the plurality of first outlet windows located at relatively outer sides. In an embodiment, the backlight module comprises a plurality of first outlet windows, and the first window length of an entire contour of the plurality of first outlet windows is as long as the second window length of the at least one second outlet window. In an embodiment, two of the plurality of second block patterns located at relatively outer sides and two of the plurality of first block patterns located at relatively outer sides correspond to each other in shape and position. In an embodiment, the backlight module comprises a light guide plate and at least one micro-structure layer, and the micro-structure layer is located on a surface of at least one of the shielding sheet, the light guide plate and the lighting board. In an embodiment, the backlight module comprises at least one micro-structure layer, the shielding sheet comprises a second frame pattern, the second frame pattern corresponds to the second outlet window and the second row pattern, and the micro-structure layer overlaps with at least one part of the second frame pattern. In an embodiment, the second outlet window further comprises at least one frame rib, and the frame rib has at least one second supplementary light window. In an embodiment, at least one of the first block patterns is identical to at least one of the second block patterns. In an embodiment, four corners of the entire contour of the at least one first outlet window are symmetrical to four corners of the at least one second outlet window. In an embodiment, the second block patterns are divided into a first group and a second group, and a number of the second group of second block patterns far away from a plurality of first outlet windows is larger than a number of the first group of at least one second block pattern close to the plurality of first outlet windows.

According to another embodiment, the invention provides a backlight module configured to illuminate a plurality of key caps. The backlight module comprises a lighting board and a shielding sheet. The lighting board comprises a plurality of illuminants aligned into two rows. The shielding sheet comprises a plurality of first outlet windows and a plurality of first block patterns disposed within the plurality of first outlet windows respectively. Each of the first block patterns respectively corresponds to one of the illuminants. The first block patterns form a first row pattern. The shielding sheet further comprises at least one second outlet window and a plurality of second block patterns disposed within the at least one second outlet window. Each of the second block patterns respectively corresponds to one of the illuminants. The second block patterns form a second row pattern. The lighting board further comprises a pair of non-intersecting traces, and the first row pattern is at least partially located between the pair of non-intersecting traces.

According to another embodiment, the invention provides a backlight module configured to illuminate a plurality of key caps. The backlight module comprises a lighting board and a shielding sheet. The lighting board comprises a plurality of illuminants aligned into two rows. The shielding sheet comprises a plurality of first outlet windows and a plurality of first block patterns disposed within the plurality of first outlet windows respectively. Each of the first block patterns respectively corresponds to one of the illuminants. The first block patterns form a first row pattern. The shielding sheet further comprises at least one second outlet window and a plurality of second block patterns disposed within the at least one second outlet window. Each of the second block patterns respectively corresponds to one of the illuminants. The second block patterns form a second row pattern. The lighting board further comprises a pair of micro-structure regions apart from each other, and at least one of the first block patterns is located between the pair of micro-structure regions.

According to another embodiment, the invention provides a lighting keyboard comprising at least one first keyswitch, at least one second keyswitch and a backlight module. The at least one second keyswitch is arranged parallel to the at least one first keyswitch. The backlight module comprises a lighting board and a shielding sheet. The lighting board comprises a plurality of illuminants corresponding to the at least one first keyswitch and the at least one second keyswitch. The shielding sheet comprises at least one first outlet window and a plurality of first block patterns disposed within the at least one first outlet window respectively. Each of the first block patterns respectively corresponds to one of the illuminants. The first block patterns form a first row pattern. The shielding sheet further comprises at least one second outlet window and a plurality of second block patterns disposed within the at least one second outlet window. Each of the second block patterns respectively corresponds to one of the illuminants. The second block patterns form a second row pattern. A first long side of an entire contour of the at least one first keyswitch is identical to a second long side of the at least one second keyswitch, and the first row pattern is different from the second row pattern. In an embodiment, the at least one first keyswitch and the at least one second keyswitch are two multiple keys located on an identical straight line, a plurality of square keys are located between the two multiple keys, and the at least one first keyswitch and the at least one second keyswitch have corresponding key cap outlets.

According to another embodiment, the invention provides a lighting board comprising a plurality of illuminants, a first pair of non-intersecting traces and a second pair of non-intersecting traces. The plurality of illuminants are aligned into two rows. The shielding sheet comprises a plurality of first outlet windows and a plurality of first block patterns disposed within the plurality of first outlet windows respectively. Each of the first block patterns respectively corresponds to one of the illuminants. The first block patterns form a first row pattern. The shielding sheet further comprises at least one second outlet window and a plurality of second block patterns disposed within the at least one second outlet window. Each of the second block patterns respectively corresponds to one of the illuminants. The second block patterns form a second row pattern. The first row pattern is located between the first pair of non-intersecting traces, the second row pattern is located between the second pair of non-intersecting traces, and the first row pattern is different from the second row pattern.

As mentioned in the above, the invention forms a protruding structure between the two non-intersecting traces or the plurality of micro-structure regions, and the position of the protruding structure corresponds to the position of the illuminant. Accordingly, the amount of light emitted by the illuminant entering the light guide panel can be increased and the micro-structure regions specifically arranged on the lighting board can be used to recycle light or assist light output, so as to enhance the overall illuminating consistency.

Furthermore, the embodiments of the invention arranges the frame pattern/block pattern of the shielding sheet in an optimal manner and simultaneously utilizes the micro-structure layer from different positions to recycle light, thereby improving the problem of uneven halo in some areas, so as to improve the contour halo uniformity of plural areas and take into account the halo uniformity of a single key in the areas.

These and other objectives of the present invention will no doubt become obvious to those of ordinary skill in the art after reading the following detailed description of the preferred embodiment that is illustrated in the various figures and drawings.

DETAILED DESCRIPTION

A low power illuminant, such as mini LED or micro LED, may be used to reduce power consumption, reduce total heat generated by a backlight module, and reduce the overall thickness of the backlight module, such that it is beneficial to further make a lighting keyboard thinner. However, the highly limited luminous range of mini LED or micro LED causes a great challenge to the luminous uniformity of a single keyswitch and the entire lighting keyboard. The embodiments of the invention first focus on how to make a large proportion of light from the illuminant enter a light guide panel for lateral transmission, and how to effectively recycle the light that passes through the light guide panel during the lateral transmission into the light guide panel for reuse.

Figure 1:
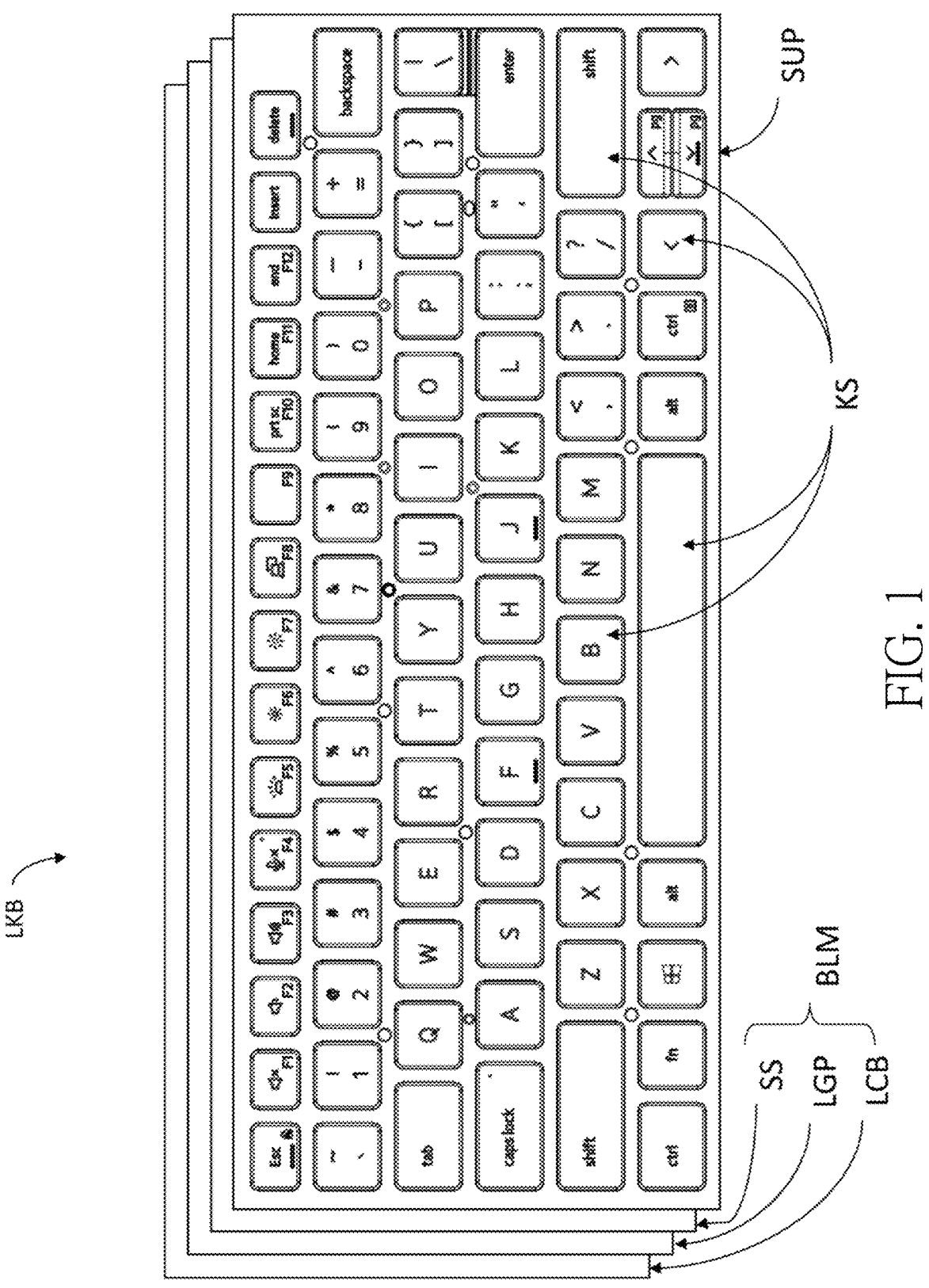
FIG. 1 is a schematic view illustrating a lighting keyboard according to an embodiment of the invention.

Referring to FIG. 1, FIG. 1 is a schematic view illustrating a lighting keyboard LKB according to an embodiment of the invention.

As shown in FIG. 1, the lighting keyboard LKB comprises a backlight module BLM and a plurality of keyswitches KS. A support plate SUP is disposed on the backlight module BLM and the keyswitches KS are disposed on the support plate SUP. In general, the keyswitches KS may comprise square keys and multiple keys (e.g. space key). It should be noted that the number, size and arrangement of the keyswitches KS may be determined according to practical applications, so the invention is not limited to the embodiment shown in the figure.

The backlight module BLM comprises a lighting board LCB, a light guide panel LGP and a shielding sheet SS. The light guide panel LGP is disposed on the lighting board LCB and the shielding sheet SS is disposed on the light guide panel LGP. Each keyswitch KS on the lighting keyboard LKB corresponds to at least one illuminant (e.g. LED) on the lighting board LCB of the backlight module BLM.

Figure 2:
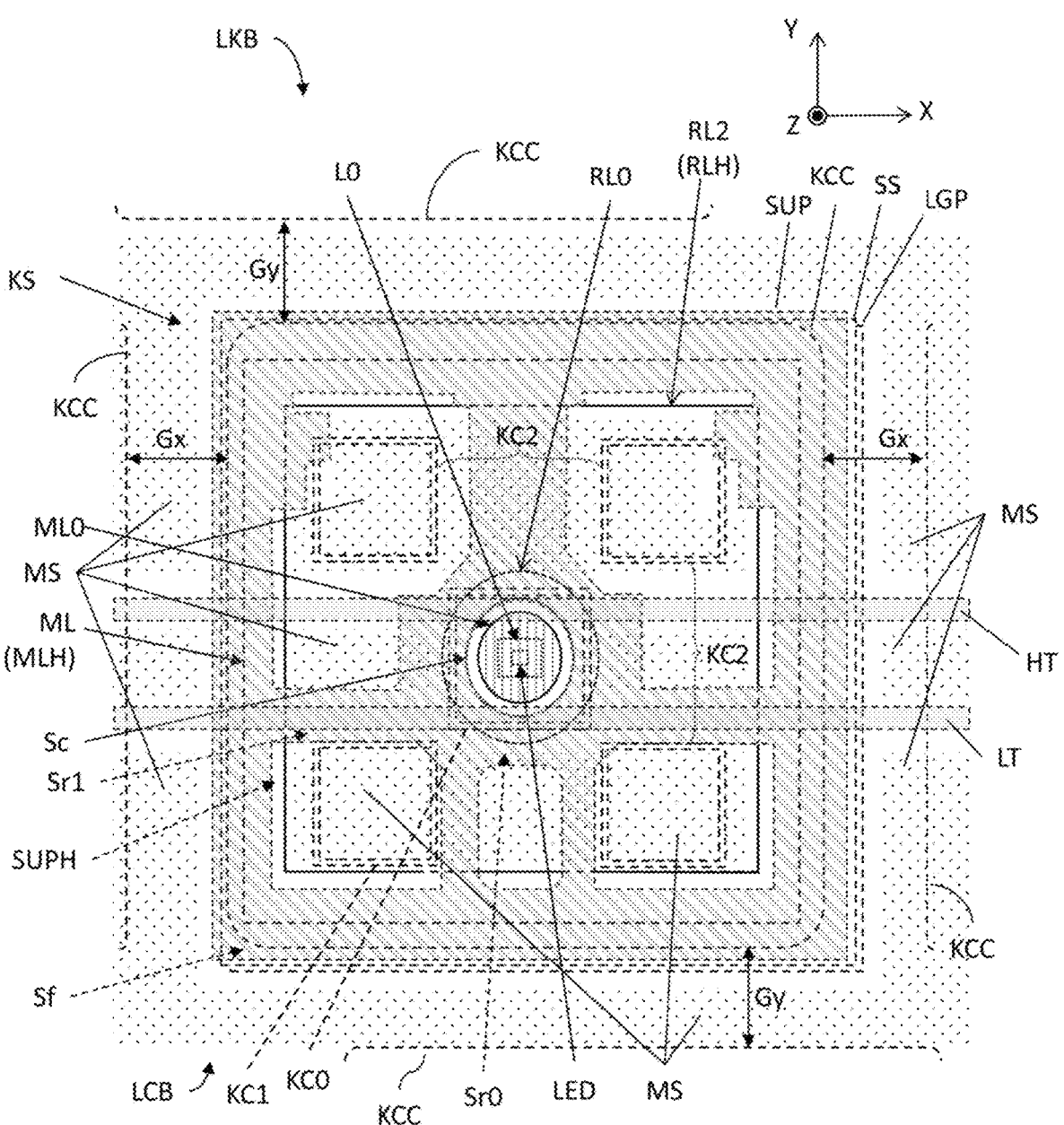
FIG. 2 is a partial top view illustrating the lighting keyboard shown in FIG. 1.
Figure 3:
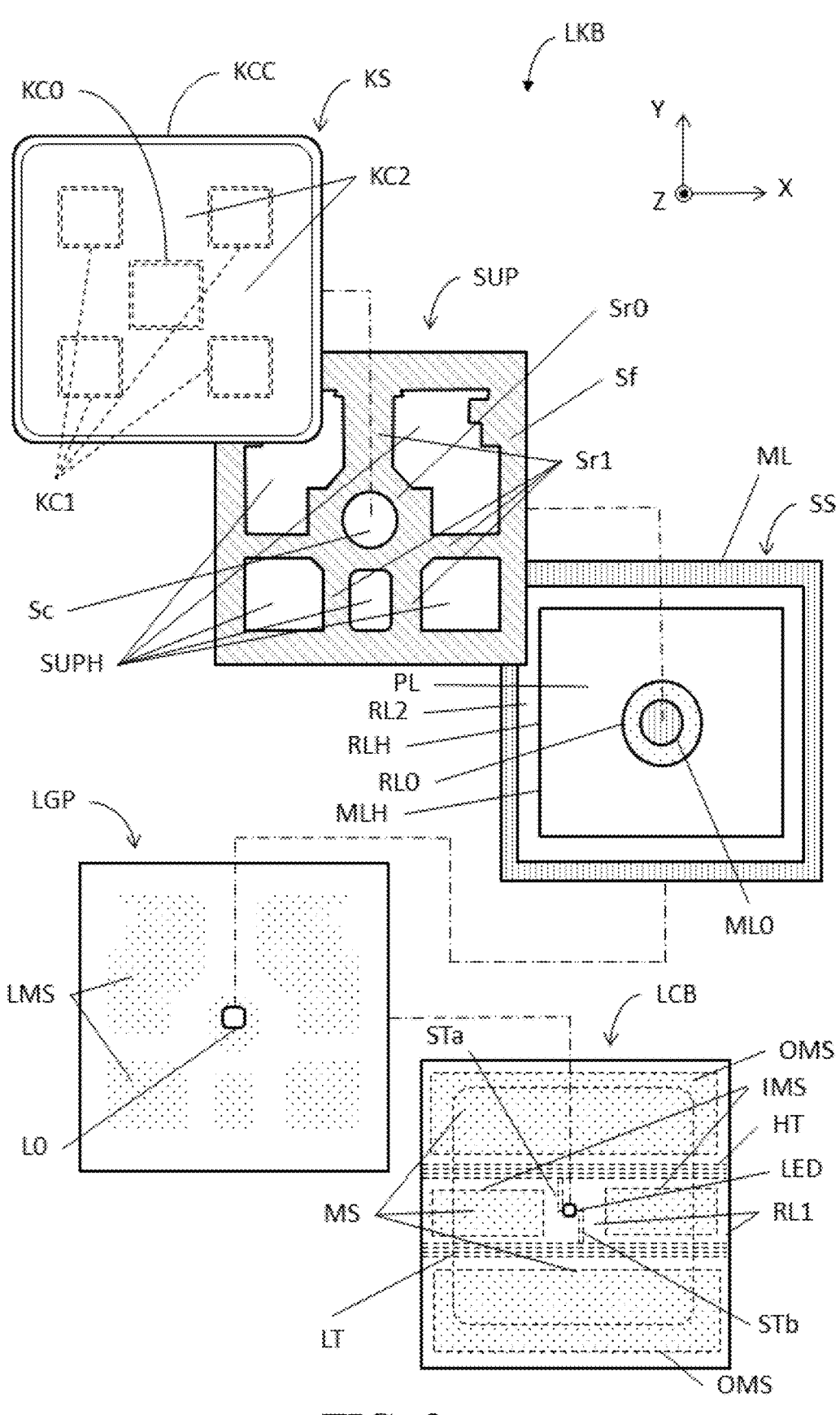
FIG. 3 is a partial exploded view illustrating the lighting keyboard shown in FIG. 1.
Figure 4:
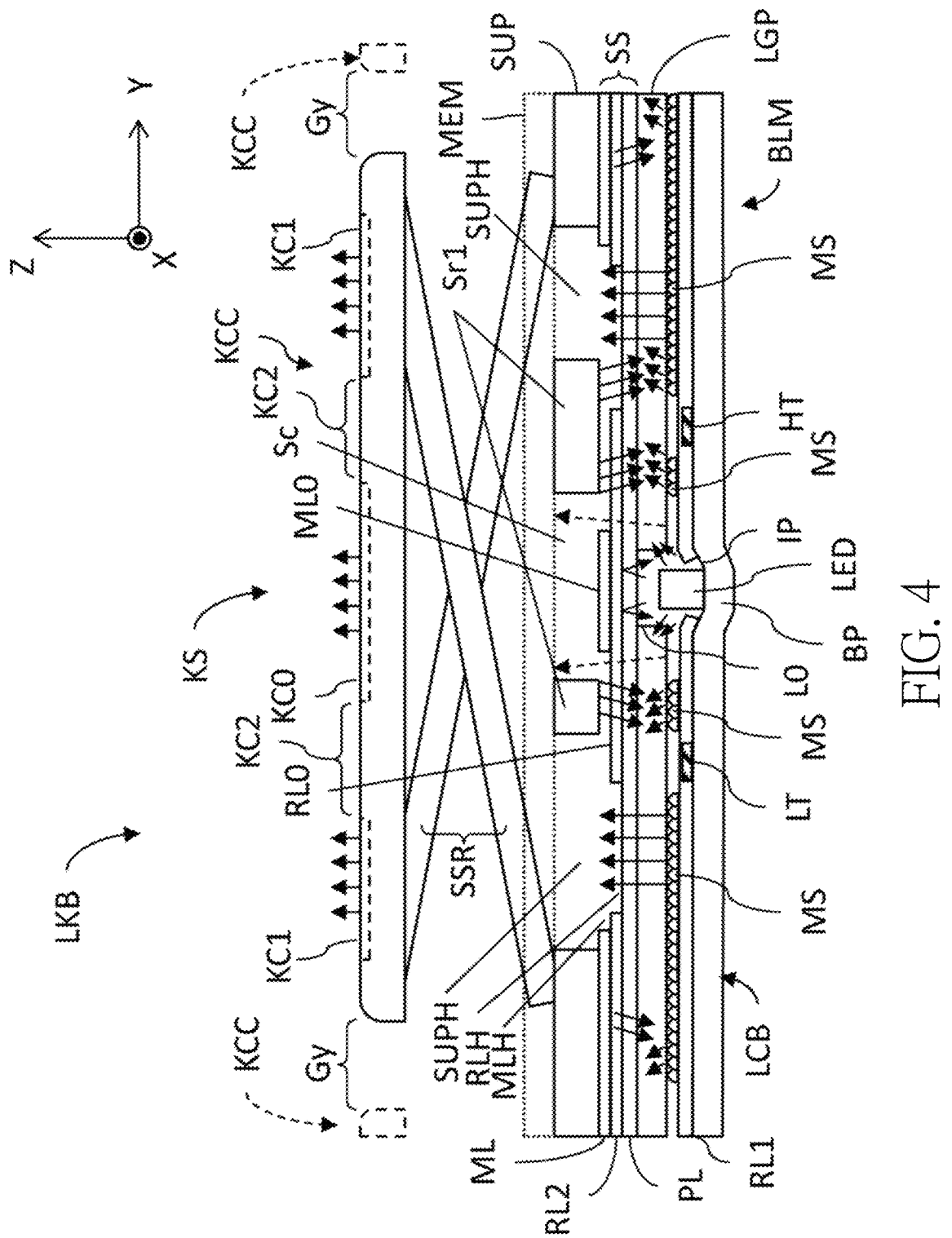
FIG. 4 is a partial sectional view illustrating the lighting keyboard shown in FIG. 1.

Referring to FIGS. 2 to 4, FIG. 2 is a partial top view illustrating the lighting keyboard LKB shown in FIG. 1, FIG. 3 is a partial exploded view illustrating the lighting keyboard LKB shown in FIG. 1, and FIG. 4 is a partial sectional view illustrating the lighting keyboard LKB shown in FIG. 1.

As shown in FIGS. 2 to 4, the lighting board LCB comprises two non-intersecting traces LT, HT, another two non-intersecting traces STa, STb, a illuminant LED, a first reflective layer RL1 and a plurality of microstructure regions MS. The lighting board LCB may be a lighting circuit board. The illuminant LED is connected between the two non-intersecting traces STa, STb, and the illuminant LED is connected between the two non-intersecting traces LT, HT through the two non-intersecting traces STa, STb. In this embodiment, the traces LT, HT are main traces of the illuminant LED and the traces STa, STb are sub-traces of the illuminant LED, wherein the trace LT may be a low-voltage trace and the trace HT may be a high-voltage trace. The illuminant LED may be a white LED or a combination of RGB LEDs according to practical applications. In general, the traces LT, HT may be the main traces with a larger cross-sectional area and may cross a plurality of keyswitches KS. The traces LT, HT do not intersect at least within a range of a single keyswitch KS, or do not intersect within a larger continuous range including a plurality of adjacent keyswitches KS and the gap(s) therebetween. The pair of traces STa, STb disposed within the range of each single keyswitch KS are sub-traces with a smaller cross-sectional area. Although the traces STa, STb may be located at the same line, the ends of the traces STa, STb are respectively connected to two electrodes of the illuminant LED. Thus, the traces STa, STb do not overlap with each other.

The first reflective layer RL1 is disposed on the two non-intersecting traces LT, HT and the other two non-intersecting traces STa, STb. The microstructure regions MS are formed on the first reflective layer RL1. In this embodiment, the microstructure regions MS may be a concave-convex structure formed on the first reflective layer RL1. For example, the lighting board LCB may be composed of a flexible circuit board and a copper mesh may be commonly used to improve the support strength of the circuit board. The first reflective layer RL1 may be formed by coating reflective paint or covering a reflective film on the surface of the flexible circuit board (including the surface of the copper mesh). The grid structure of the copper mesh may make the first reflective layer RL1 form regular concave points (grid points) and convex regions (grid lines). The concave points and convex regions function as reflective points capable of reflecting light back to the light guide panel LGP. In fact, copper wire regions (e.g. traces LT, HT, STa, STb) may also form protruding linear reflective regions. In principle, the copper mesh does not overlap with the traces LT, HT on the flexible circuit board and does not electrically connect the traces STa, STb. In practical applications, the copper mesh can achieve an effect of shielding radio frequency interference, so the copper mesh may be connected to the ground of the traces. However, in practice, a concave-convex reflective structure may not be possible to be formed by any reflective layer covering the copper mesh and traces. If the first reflective layer RL1 is an independent thin film component, the thickness of the first reflective layer RL1 must be thin enough, e.g. lower than the thickness of the copper foil substrate (including the adjacent tiled copper mesh and copper wire region). Furthermore, the first reflective layer RL1 needs to have a high degree of plasticity, so as to form a concave-convex microstructure on the copper mesh and copper wire region when covering the copper foil substrate. If the first reflective layer RL1 is formed by ink coating, the coating thickness, ink consistency, coating region control, etc. must be strictly controlled; otherwise the hollow space of the original copper foil substrate will be easily filled by ink flow, which will reduce the depth of the reflective microstructure and the effect of reflective diffusion.

In addition, even if the traces of the lighting board LCB are not copper foil substrate, there is neither a thicker copper trace nor a copper mesh to strengthen the structural strength of the lighting board LCB, a microstructure with a diffusion effect may still be formed on the first reflective layer RL1. For example, micro-dot ink may be printed on the first reflective layer RL1 to form concave/convex regions as the microstructure regions MS; or the ink with larger size reflective particles may be used to spray or print the first reflective layer RL1 to simultaneously form the concave/convex regions as the microstructure regions MS; or, if the first reflective layer RL1 is a layer of reflective film, as long as the surface of the reflective film has reflective particles with medium or low flatness and has a concave-convex reflective surface, the reflective film may be used as the microstructure regions MS.

In this embodiment, within a range of a single keyswitch KS, the microstructure regions MS comprises two inner microstructure regions IMS and two outer microstructure regions OMS, wherein the two inner microstructure regions IMS are located between the two non-intersecting traces LT, HT, and the two outer microstructure regions OMS are located beyond the two non-intersecting traces LT, HT. The patterns of the two inner microstructure regions IMS may be different from the patterns of the two outer microstructure regions OMS, but the invention is not so limited. The illuminant LED is located between the microstructure regions MS, i.e. the illuminant LED is located between the two inner microstructure regions IMS and also located between the two outer microstructure regions OMS.

In this embodiment, the traces STa, STb separate the two inner microstructure regions IMS, so the traces STa, STb are also located between the two inner microstructure regions IMS. Similarly, the traces LT, HT respectively separate one outer microstructure region OMS and two inner microstructure regions IMS, so it can also be said that the traces LT, HT are respectively located between one outer microstructure region OMS and two inner microstructure regions IMS. In some embodiments, the aforesaid microstructure regions MS, no matter whether they are the outer microstructure regions OMS or the inner microstructure regions IMS, neither overlap with the traces LT, HT, nor overlap with the traces STa, STb. For example, there is the case when the traces of the lighting board LCB are formed by copper wires with copper mesh. If the microstructure regions MS on the first reflective layer RL1 is only surface-treated and not formed from the underlying copper mesh or other substrates, the microstructure regions MS/OMS/IMS may overlap with the traces LT, HT, or overlap with the traces STa, STb. The light guide panel LGP has a light guide hole L0 and the illuminant LED is located in the light guide hole L0. The top surface and/or the bottom surface of the light guide panel LGP close to the light guide hole L0 may have adhesive around the light guide hole L0 to adhere the shielding sheet SS and/or the lighting board LCB respectively. Furthermore, the light guide panel LGP also has a plurality of microstructure regions LMS corresponding to the positions of an inner hole Sc and peripheral holes SUPH of the support plate SUP, so as to guide the light transmitted in the light guide panel LGP to emit out upward. Under the orthographic projection of the peripheral hole SUPH of the support plate SUP, the microstructure regions LMS of the light guide panel LGP may at least partially overlap with the microstructure regions MS of the first reflective layer RL1 of the lighting board LCB, such that it may increase the illuminating effect of the light passing through the inner hole Sc and the peripheral hole SUPH, and improve the brightness of the corner symbol of the keycap KCC (outer outlet KC1). The inner microstructure regions IMS, which is on the first reflective layer RL1 of the lighting board LCB and close to the illuminant LED, may be used as an optical adjustment manner. When the light output near the illuminant LED is excessively weakened (e.g. resulted from the area of an inner mask layer ML0 of a mask layer ML of the shielding sheet SS is too large, or the light transmittance of an inner reflective section RL0 of a second reflective layer RL2 is too low), at this time, the inner microstructure regions IMS, which is on the first reflective layer RL1 of the lighting board LCB and close to the illuminant LED, can enhance the illuminating effect of the light passing through the inner hole Sc or the inner outlet KC0 of the keycap KCC.

A preferred manner to optimize the arrangement of the aforesaid microstructure regions MS/OMS/IMS is to dispose the traces STa, STb, LT, HT as far as possible to overlap with any rib region or frame region (e.g. surrounding rib Sr0, bridge rib Sr1 and support frame Sf) of the support plate SUP. Thus, the aforesaid microstructure regions MS/OMS/IMS may correspond to the microstructure regions LMS of the light guide panel LGP, correspond to the peripheral hole SUPH or the inner hole Sc of the support plate SUP, and correspond to the inner outlet KC0 and the outer outlet KC1 of the keycap KCC. Furthermore, the microstructure regions MS/OMS/IMS may overlap with the surrounding rib Sr0, the bridge rib Sr1 or the support frame Sf. Although these positions cannot emit light, the microstructure regions MS/OMS/IMS can help guide the light that escapes from the light guide panel LGP into the light guide panel LGP for recycling, such that it is helpful for enhancing the illuminating effect of the light emitted from the outer side or even another adjacent keyswitch KS. Needless to say, the aforesaid microstructure regions MS/OMS/IMS may also overlap with the second reflective layer RL2 of the shielding sheet SS (including the inner reflective section RL0 and the outer frame of the second reflective layer RL2), and that is also helpful to recycle light into the light guide panel LGP.

The shielding sheet SS is disposed above the microstructure regions MS. The shielding sheet SS comprises a mask layer ML, a second reflective layer RL2 and a protection layer PL, wherein the mask layer ML, the second reflective layer RL2 and the protection layer PL may be stacked with each other by various manners. For example, each of the mask layer ML, the second reflective layer RL2 and the protection layer PL may be stacked on top, middle or bottom to form the shielding sheet SS. The mask layer ML is opaque. The second reflective layer RL2 may have reflective and translucent characteristics at the same time, i.e. the second reflective layer RL2 may reflect part of the light and allow part of the light to pass through. The mask layer ML may be black ink and the second reflective layer RL2 may be white ink, but the invention is not so limited. In this embodiment, the mask layer ML has a mask layer hole MLH and an inner mask layer ML0 located in the mask layer hole MLH, and the second reflective layer RL2 has a reflective layer hole RLH and an inner reflective section RL0 located in the reflective layer hole RLH. The mask layer hole MLH may be larger than, equal to or smaller than the reflective layer hole RLH, and the inner mask layer ML0 may be larger than, equal to or smaller than the inner reflective section RL0, wherein it depends on the desired illuminating effect. The inner mask layer ML0 and the inner reflective section RL0 are located above the illuminant LED. In this embodiment, the inner mask layer ML0 and/or the inner reflective section RL0 above the illuminant LED is at least partially projected between the two non-intersecting traces LT, HT or between the two non-intersecting traces STa, STb.

Each of the keyswitches KS comprises a part of the support plate SUP. In this embodiment, the support plate SUP has an inner hole Sc, a surrounding rib Sr0, a plurality of bridge ribs Sr1 and a support frame Sf, wherein the surrounding rib Sr0 surrounds the inner hole Sc, and the bridge ribs Sr1 connect the surrounding rib Sr0 and the support frame Sf. Furthermore, there are a plurality of peripheral holes SUPH between the bridge ribs Sr1, the surrounding rib Sr0 and the support frame Sf. In this embodiment, the two inner microstructure regions IMS at least partially overlap with projections of the inner hole Sc, the surrounding rib Sr0, the bridge ribs Sr1 and/or the support frame Sf. Still further, the two outer microstructure regions OMS at least partially overlap with projections of the surrounding rib Sr0, the plurality of bridge ribs Sr1 and/or the support frame Sf.

The keyswitch KS comprises a keycap KCC, a support mechanism SSR, a circuit board MEM and a support plate SUP. The keycap KCC is disposed with respect to the support plate SUP. The keycap KCC has an inner outlet KC0 and a plurality of outer outlets KC1, wherein the inner outlet KC0 and the outer outlets KC1 are surrounded by an opaque area KC2. The positions of the inner outlet KC0 and the outer outlets KC1 correspond to the positions of the inner hole Sc and the peripheral holes SUPH of the support plate SUP, such that the light emitted by the illuminant LED may be projected from the inner outlet KC0 and the outer outlets KC1 of the keycap KCC through the light guide panel LGP, the shielding sheet SS, the inner hole Sc and the peripheral holes SUPH of the support plate SUP. The support mechanism SSR is disposed between the keycap KCC and the support plate SUP. When the keycap KCC is pressed, the keycap KCC will move vertically toward the support plate SUP along with the support mechanism SSR. Furthermore, a restoration member (not shown) may be further disposed between the keycap KCC and the support plate SUP, wherein the restoration member may be, but is not limited to, a rubber dome. The circuit board MEM may have a switch (e.g. membrane switch or other trigger switches) corresponding to the keyswitch KS.

From top view, the illuminant LED, the light guide hole L0, the inner reflective section RL0, the inner mask layer ML0, the inner hole Sc, the inner outlet KC0 and the adhesive around the light guide hole L0 may be located between the two non-intersecting traces LT, HT and/or STa, STb.

From top view, the illuminant LED, the light guide hole L0, the inner reflective section RL0, the inner mask layer ML0, the inner hole Sc, the inner outlet KC0 and the adhesive around the light guide hole L0 may be located between the two inner microstructure regions IMS.

As shown in FIG. 4, the backlight module BLM further comprises a protrusion structure BP, wherein the position of the protrusion structure BP corresponds to the position of the illuminant LED, and the protrusion structure BP is located between the two non-intersecting traces LT, HT. Furthermore, the protrusion structure BP is also located between the microstructure regions MS, i.e. the protrusion structure BP is located between the two inner microstructure regions IMS and also located between the two outer microstructure regions OMS. In this embodiment, the protrusion structure BP is formed on the lighting board LCB and the protrusion structure BP forms a notch IP for accommodating the illuminant LED, such that an upper surface of the illuminant LED is flash with or lower than an upper surface of the light guide panel LGP and higher than a lower surface of the light guide panel LGP. Since the shielding sheet SS is disposed on the light guide panel LGP, the upper surface of the illuminant LED is also flash with or lower than a lower surface of the shielding sheet SS, such that the shielding sheet SS can be kept flat and will not be pushed by the illuminant LED to partially enter the inner hole Sc of the support plate SUP. Accordingly, the amount of light emitted by the illuminant LED entering the light guide panel LGP can be increased, so as to enhance the overall illuminating consistency. Moreover, the circuit board MEM may have a switch disposed with respect to the inner hole Sc of the support plate SUP, such that the switch may partially enter the inner hole Sc of the support plate SUP without interfering with the shielding sheet SS and the illuminant LED below the shielding sheet SS.

Figure 5:
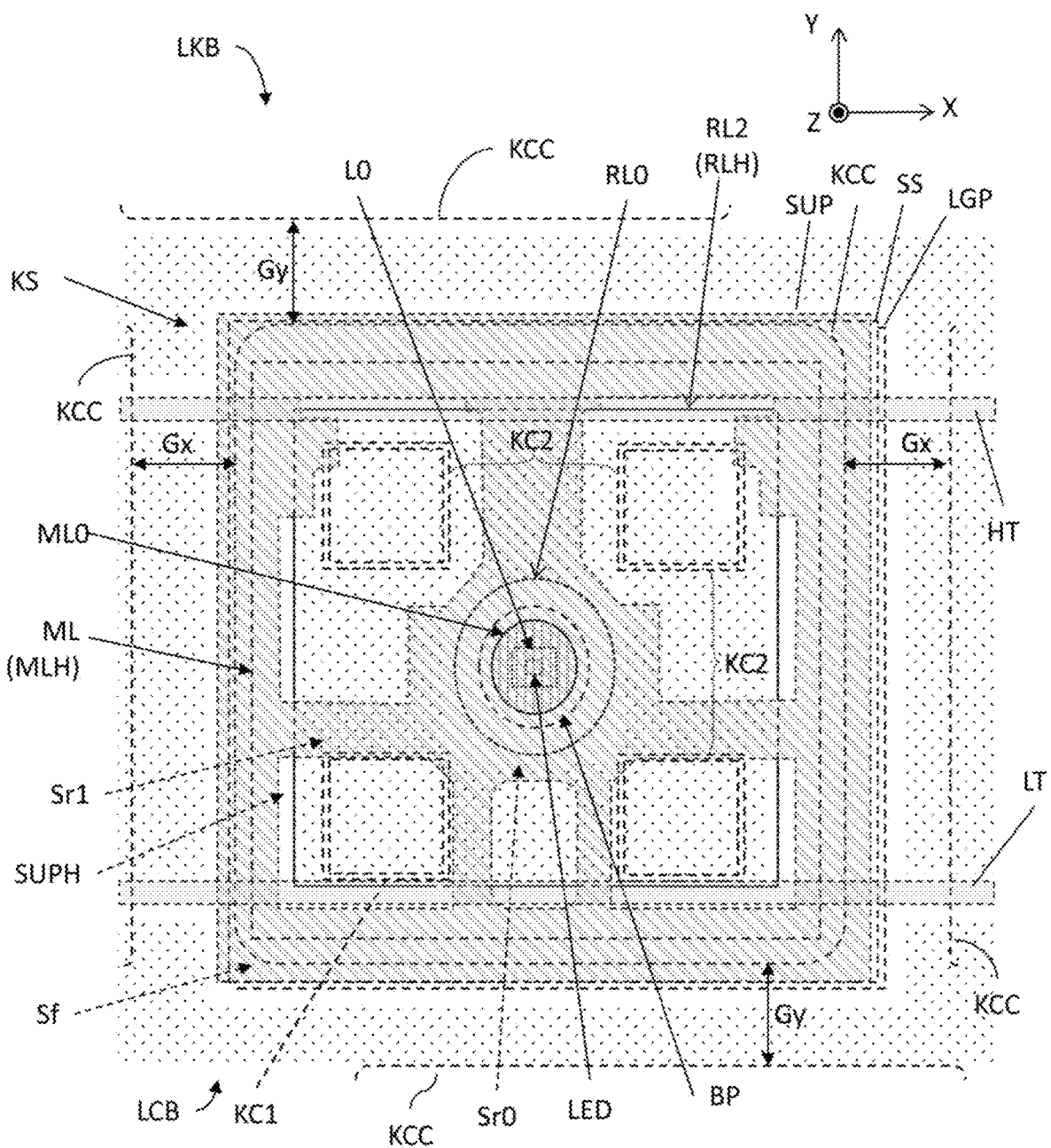
FIG. 5 is a partial top view illustrating the lighting keyboard according to another embodiment of the invention.
Figure 6:
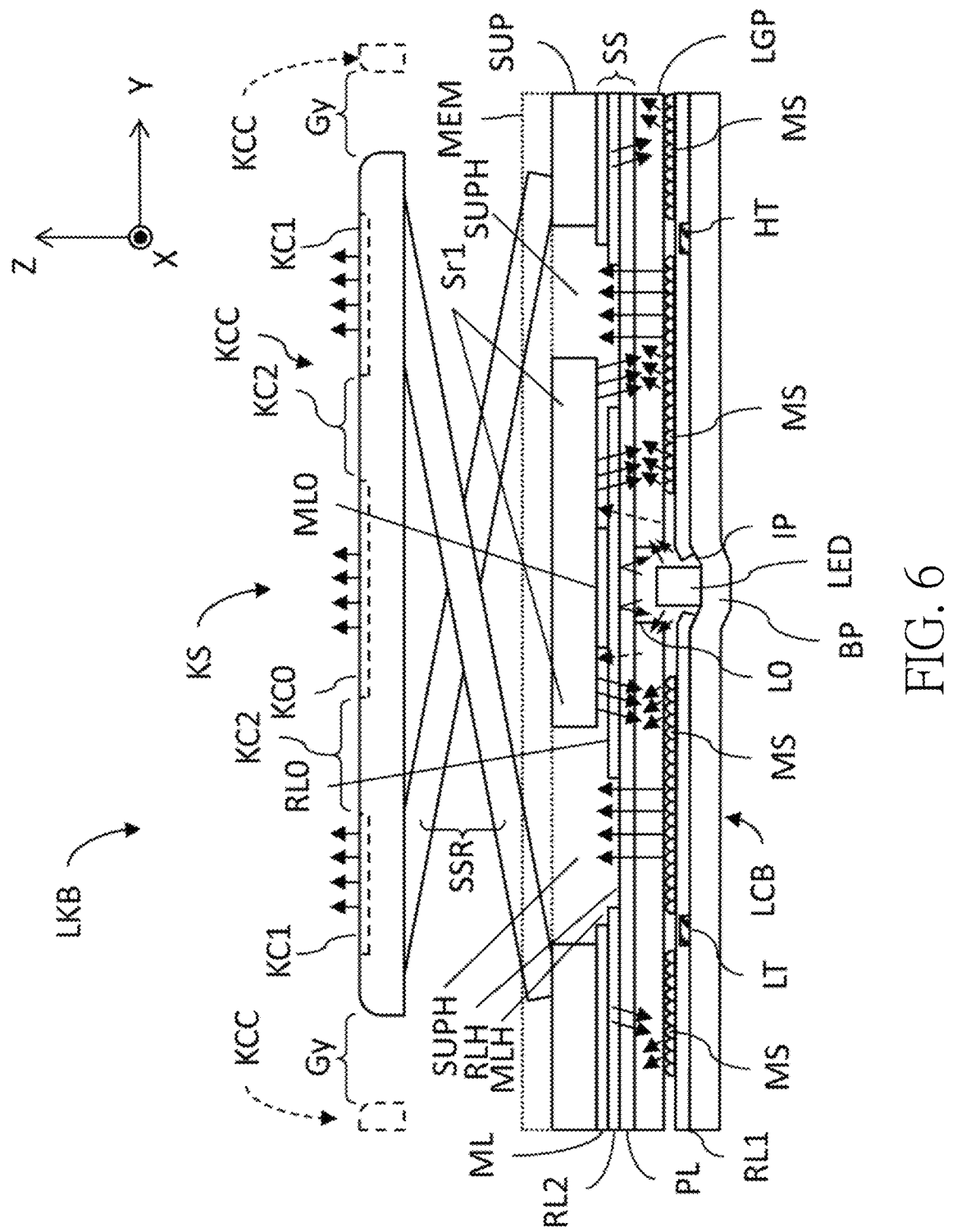
FIG. 6 is a partial sectional view illustrating the lighting keyboard shown in FIG. 5.

Referring to FIGS. 5 and 6, FIG. 5 is a partial top view illustrating the lighting keyboard LKB according to another embodiment of the invention, and FIG. 6 is a partial sectional view illustrating the lighting keyboard LKB shown in FIG. 5.

As shown in FIGS. 5 and 6, the support plate SUP may not have the aforesaid inner hole Sc. At this time, the shielding sheet SS is kept flat and will not be pushed by the illuminant LED. When the support plate SUP does not have the inner hole Sc, the keycap KCC may have no inner outlet KC0. However, if the keycap KCC has the inner outlet KC0, the peripheral holes SUPH around the central area of the keycap KCC may be used to emit light, such that the light is projected from the inner outlet KC0 without the inner hole Sc. In this embodiment, the two non-intersecting traces HT, LT may overlap with a projection of at least one of the at least one outer outlet KC1. As long as the two non-intersecting traces HT, LT meet at least one of the following three conditions, the traces HT, LT will not affect the light emitted from the outer outlet KC1 of the keycap KCC. Condition 1: the two non-intersecting traces HT, LT overlap with projections of the surrounding rib Sr0, the bridge ribs Sr1 and/or the support frame Sf. Condition 2: the two non-intersecting traces HT, LT overlap with projections of the mask layer ML and/or the second reflective layer RL2 of the shielding sheet SS. Condition 3: the two non-intersecting traces HT, LT overlap with projections of the opaque area KC2 of the keycap KCC.

Figure 7:
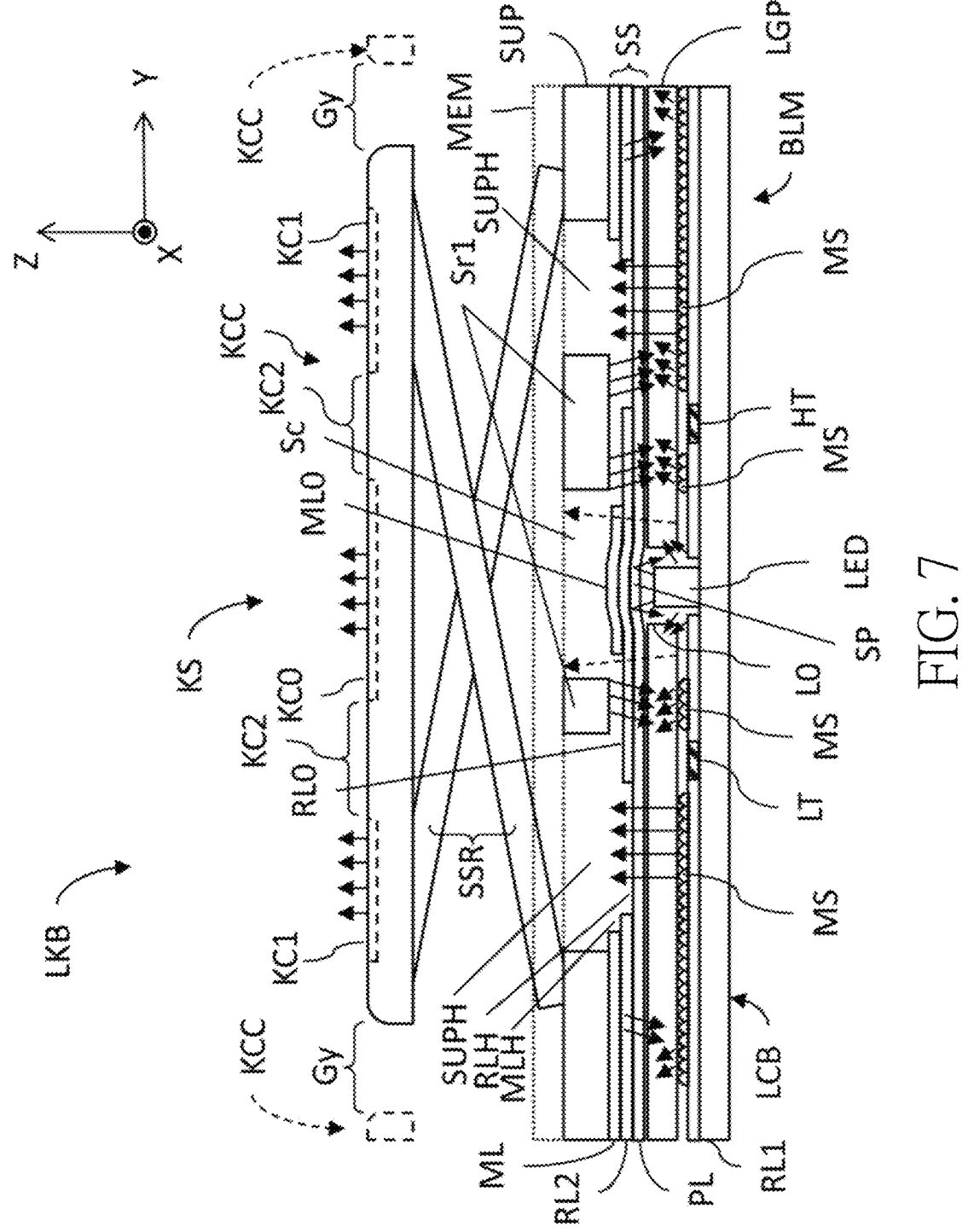
FIG. 7 is a partial sectional view illustrating the lighting keyboard according to another embodiment of the invention.

Referring to FIG. 7, FIG. 7 is a partial sectional view illustrating the lighting keyboard LKB according to another embodiment of the invention.

As shown in FIG. 7, a protrusion structure SP of the backlight module BLM may be formed on the shielding sheet SS, wherein the illuminant LED is located below the protrusion structure SP. The position of the protrusion structure SP corresponds to the position of the illuminant LED, and the protrusion structure SP is located between the two non-intersecting traces LT, HT. Furthermore, the protrusion structure SP is also located between the microstructure regions MS, i.e. the protrusion structure SP is located between the two inner microstructure regions IMS and also located between the two outer microstructure regions OMS. In this embodiment, the protrusion structure SP may be lower than or slightly enter the inner hole Sc of the support plate SUP, and an upper surface of the illuminant LED is flash with or lower than an upper surface of the light guide panel LGP or a lower surface of the shielding sheet SS. In FIG. 7, since the protrusion structure SP is formed on the shielding sheet SS, the second reflective layer RL0 of the shielding sheet SS above the illuminant LED forms a curved surface or an inclined surface due to the protrusion structure SP. Because the reflection angle provided by the flat second reflective layer RL0 is small, it is difficult to guide the light emitted upward to directly enter the wall of the light guide hole L0 of the light guide panel LGP.

Figure 8:
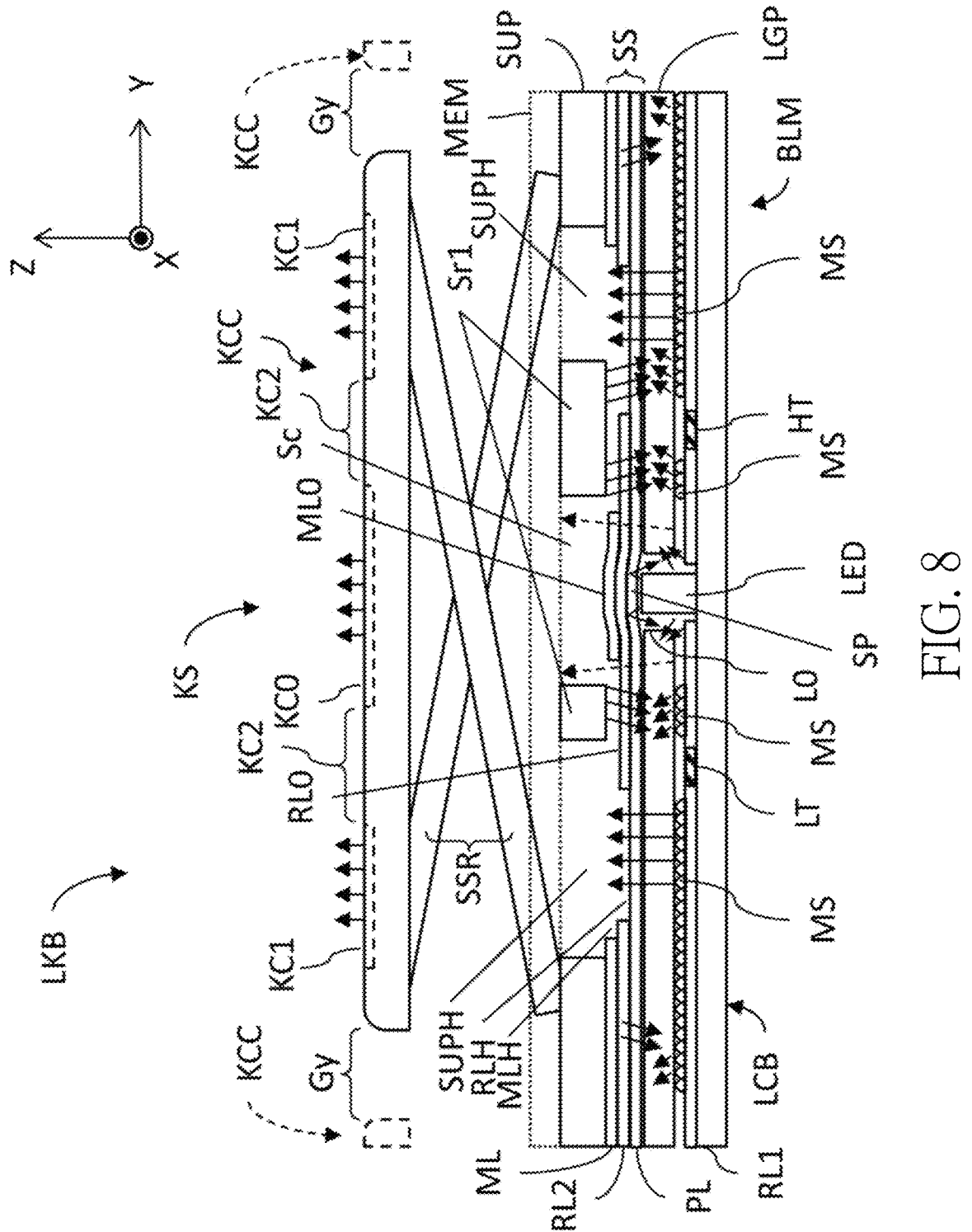
FIG. 8 is a partial sectional view illustrating the lighting keyboard according to another embodiment of the invention.

Referring to FIG. 8, FIG. 8 is a partial sectional view illustrating the lighting keyboard LKB according to another embodiment of the invention.

As shown in FIG. 8, an upper surface of the illuminant LED may be higher than an upper surface of the light guide panel LGP and lower than a lower surface of the shielding sheet SS, i.e. the upper surface of the illuminant LED may be located between the upper surface of the light guide panel LGP and the lower surface of the shielding sheet SS. In other words, if necessary, the upper surface of the illuminant LED may exceed the upper surface of the light guide panel LGP. For example, the protrusion structure SP protrudes upward may release the thickness of the shielding sheet SS itself and the thickness of the adhesive layers above and below the shielding sheet SS to provide a space for accommodating the illuminant LED. At this time, the upper surface of the illuminant LED is located between the lower surface of the support plate SUP and the upper surface of the light guide panel LGP. Accordingly, when the upper surface of the illuminant LED is higher than the upper surface of the light guide panel LGP, the protrusion structure SP may provide a space for accommodating the illuminant LED, so as to prevent the illuminant LED from interfering with the shielding sheet SS.

Figure 9:
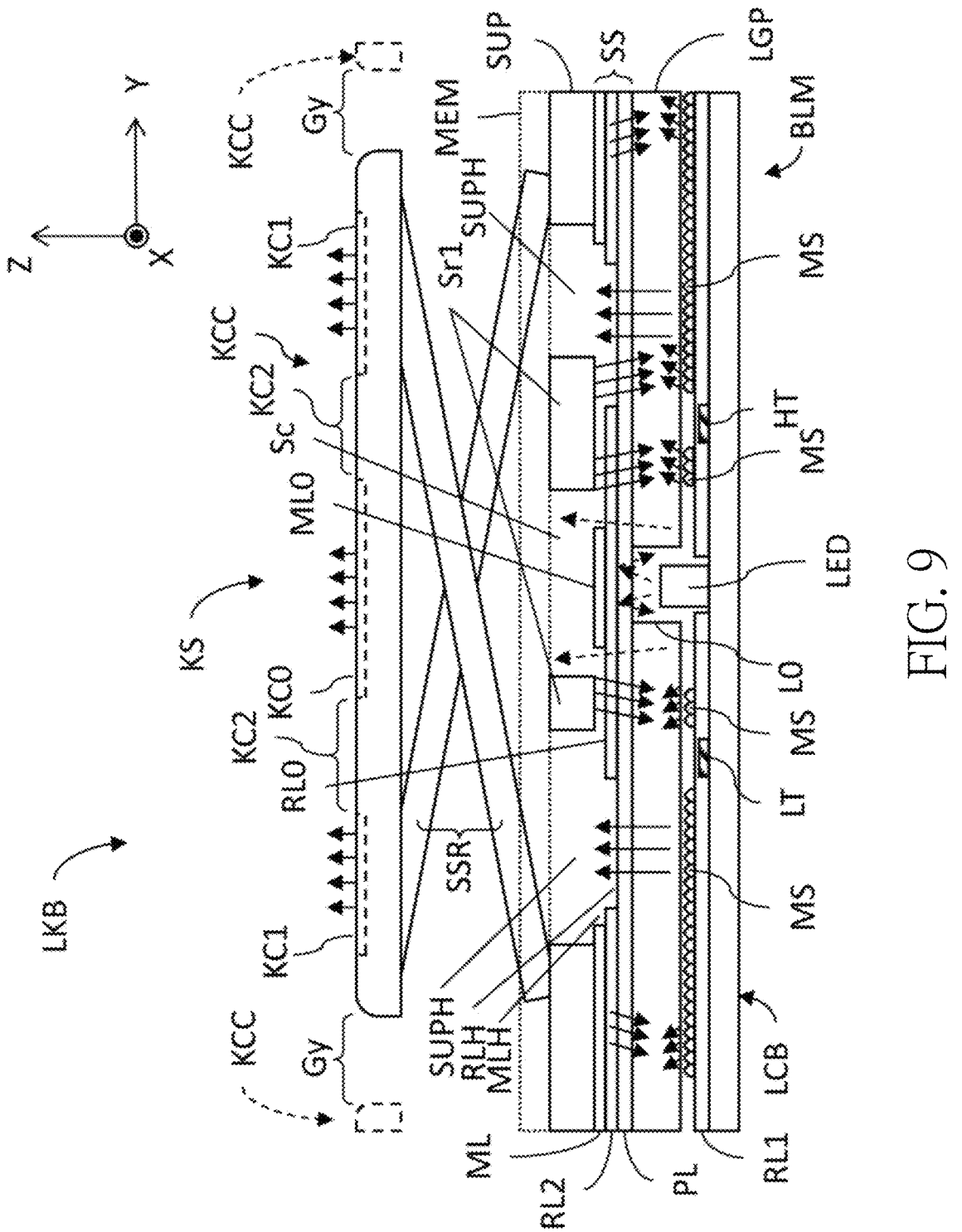
FIG. 9 is a partial sectional view illustrating the lighting keyboard according to another embodiment of the invention.

Referring to FIG. 9, FIG. 9 is a partial sectional view illustrating the lighting keyboard LKB according to another embodiment of the invention.

As shown in FIG. 9, the lighting keyboard LKB may not comprise the protrusion structure BP shown in FIG. 4 or the protrusion structure SP shown in FIG. 7. In this embodiment, an upper surface of the illuminant LED is flash with or lower than an upper surface of the light guide panel LGP and higher than a lower surface of the light guide panel LGP. Accordingly, the amount of light emitted by the illuminant LED entering the light guide panel LGP can be increased, so as to enhance the overall illuminating consistency.

Figure 10:
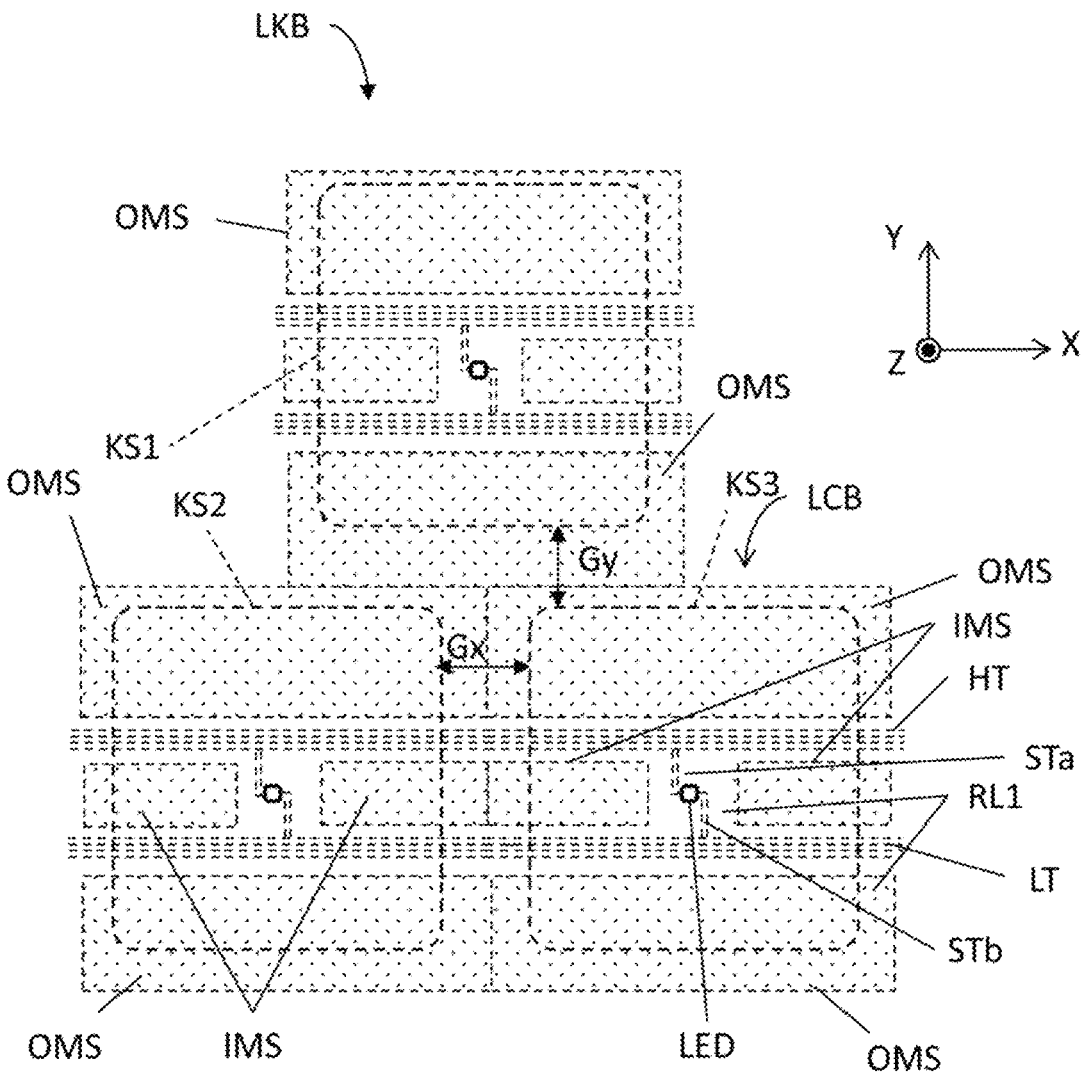
FIG. 10 is another partial top view illustrating the lighting keyboard shown in FIG. 1.

Referring to FIG. 10, FIG. 10 is another partial top view illustrating the lighting keyboard LKB shown in FIG. 1.

As shown in FIG. 10, at least parts of the microstructure regions OMS, IMS overlap with the gaps Gx, Gy between any two adjacent keyswitches KS1, KS2, KS3. Three adjacent keyswitches KS1, KS2, KS3 may have three adjacent outer microstructure regions OMS, wherein the three adjacent outer microstructure regions OMS are joined together in the X and Y directions. The two outer microstructure regions OMS disposed outside two non-intersecting traces of the lighting board LCB under a keyswitch KS may have the same pattern, which may have same size, same shape and same distance (outside the traces) in two identical regions. Within the projected range of a single keyswitch KS (e.g. square key), the two outer microstructure regions OMS may have different patterns defined by the keyswitch KS. For two adjacent keyswitches KS in the Y direction, the two outer microstructure regions OMS may have different patterns defined by the two adjacent keyswitches KS.

Figure 11:
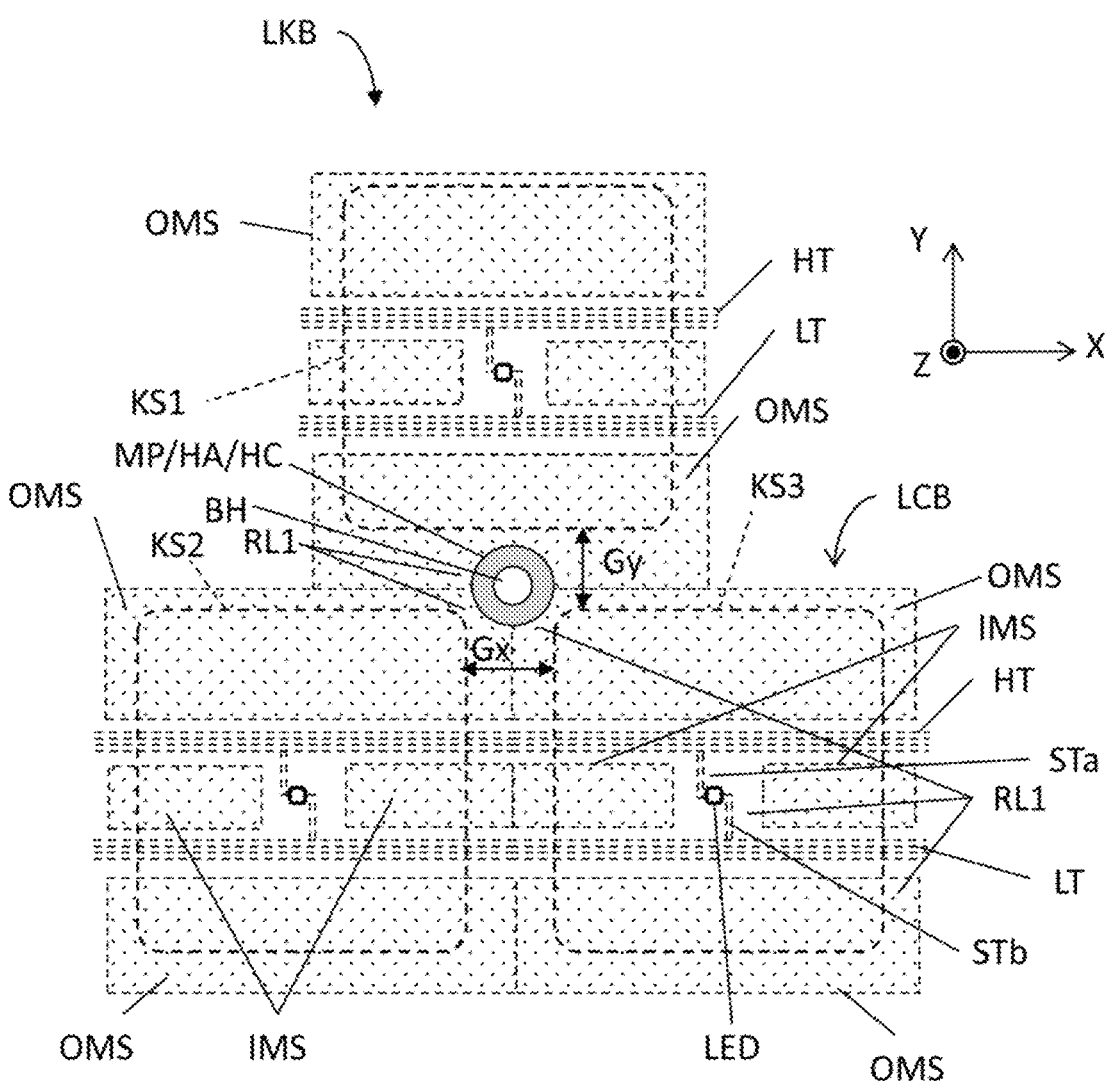
FIG. 11 is another partial top view illustrating the lighting keyboard shown in FIG. 1.

Referring to FIG. 11, FIG. 11 is another partial top view illustrating the lighting keyboard LKB shown in FIG. 1.

As shown in FIG. 11, a board hole BH may be formed on the lighting board LCB, wherein the board hole BH is used for fixing or heat dissipation. A mask portion MP may be disposed on the lighting board LCB, wherein the mask portion MP surrounds the board hole BH and is used to shield and absorb light, so as to prevent the light from leaking from the board hole BH. In practice, the mask portion MP may be a light absorbing or opaque substrate of the lighting board LCB, i.e. the first reflective layer RL1, trace layer and insulating layer (if necessary) above the substrate of the lighting board LCB are all formed with corresponding holes larger than the board hole BH, so as to expose the mask portion MP surrounding the board hole BH. Another manner in practice is to coat a layer of mask portion MP on the upper surface of the first reflective layer RL1 of the lighting board LCB to surround the board hole BH. At this time, the hole size of the first reflective layer RL1 is similar to the board hole BH. The board hole BH and the mask portion MP on the lighting board LCB may correspond to a board hole and a mask portion (not shown) on the shielding sheet SS. A hole adhesive HA on the lighting board LCB may be disposed on the mask portion MP and surround the board hole BH. A hole clearance HC does not overlap with the outer microstructure regions OMS or any microstructure. The hole clearance HC without the first reflective layer RL1 may be defined between the first reflective layer RL1 and the board hole BH. The hole clearance HC without an adhesive may be defined between the hole adhesive HA and the board hole BH. The inner microstructure regions (between the two non-intersecting traces HT, LT and/or between the two non-intersecting traces STa, STb) do not overlap with the board hole BH, the hole adhesive HA and/or the hole clearance HC. A plurality of adjacent keyswitches KS1, KS2, KS3 in the X and/or Y direction may have adjacent outer microstructure regions OMS that jointly surround the mask portion MP, the board hole BH, the hole adhesive HA and/or the hole clearance HC. The mask portion MP, the board hole BH, the hole adhesive HA and/or the hole clearance HC is located between the traces HT, LT corresponding to the keyswitch KS1 and the traces HT, LT correspond to the keyswitches KS2, KS3. For further explanation, the mask portion MP, the board hole BH, the hole adhesive HA and/or the hole clearance HC may be located between the trace LT corresponding to the keyswitch KS1 and the trace HT correspond to the keyswitches KS2, KS3. It should be noted that the mask portion MP, the hole adhesive HA and the hole clearance HC are schematically illustrated at the same position shown in FIG. 11. However, the definitions of the mask portion MP, the hole adhesive HA and the hole clearance HC can be clearly understood from the above description.

As mentioned in the above, the invention makes the plurality of microstructure regions on the lighting board not overlap with the two non-intersecting traces. Accordingly, the microstructure regions specifically arranged on the lighting board can be used to recycle light or assist light output, so as to enhance the overall illuminating consistency. Furthermore, although the technical feature of the invention is depicted to solve the problem of low power illuminant, the invention is also applicable to an application of medium or high power illuminant in a backlight module.

Moreover, In addition to the uniform brightness of the characters of each key cap KCC (e.g. the inner outlet KC0 and the outer outlet KC1), the halos generated around each key cap must also achieve uniform luminescence. First, the halos of four sides of a single keyswitch must be consistent; secondly, for two keyswitch areas whose shape and size are symmetrical to each other (e.g. two rows of keyswitches with the same overall shape and length), the contour halos of two corresponding areas must also meet the uniform requirements. For further explanation, most of the keyswitches KS of the lighting keyboard LKB have the same short side length (Y direction), but the long side lengths (X direction) are not the same. The 26 English letter keyswitches and one row of number keyswitches above are single-size or square keys close to a square. When the size of the key cap is the same, each key cap KCC may obtain a similar halo brightness by using the outlet window of the same size on the shielding sheet SS (e.g. achieved by the reflective layer hole RLH and/or the mask layer hole MLH in the aforesaid embodiment). However, when the size of several key caps in two keyswitch areas is inconsistent (especially when a row of plural square keyswitches is arranged side by side with a row of larger multi-size keys), the inconsistency between the upper contour halos and the lower contour halos of the two keyswitch areas (two rows of keyswitches KS1/KS2) will be particularly obvious. However, it is not easy to adjust only by the size of the outlet window in practice. When the outlet window is too large, it is easy to reveal high brightness of the micro-structure region MS of the backlight module BLM from the gap around the key cap; and when the outlet window is too small, the brightness of the halo will be greatly reduced. The following embodiments of the invention will introduce several technical solutions to solve related problems.

Figure 12A:
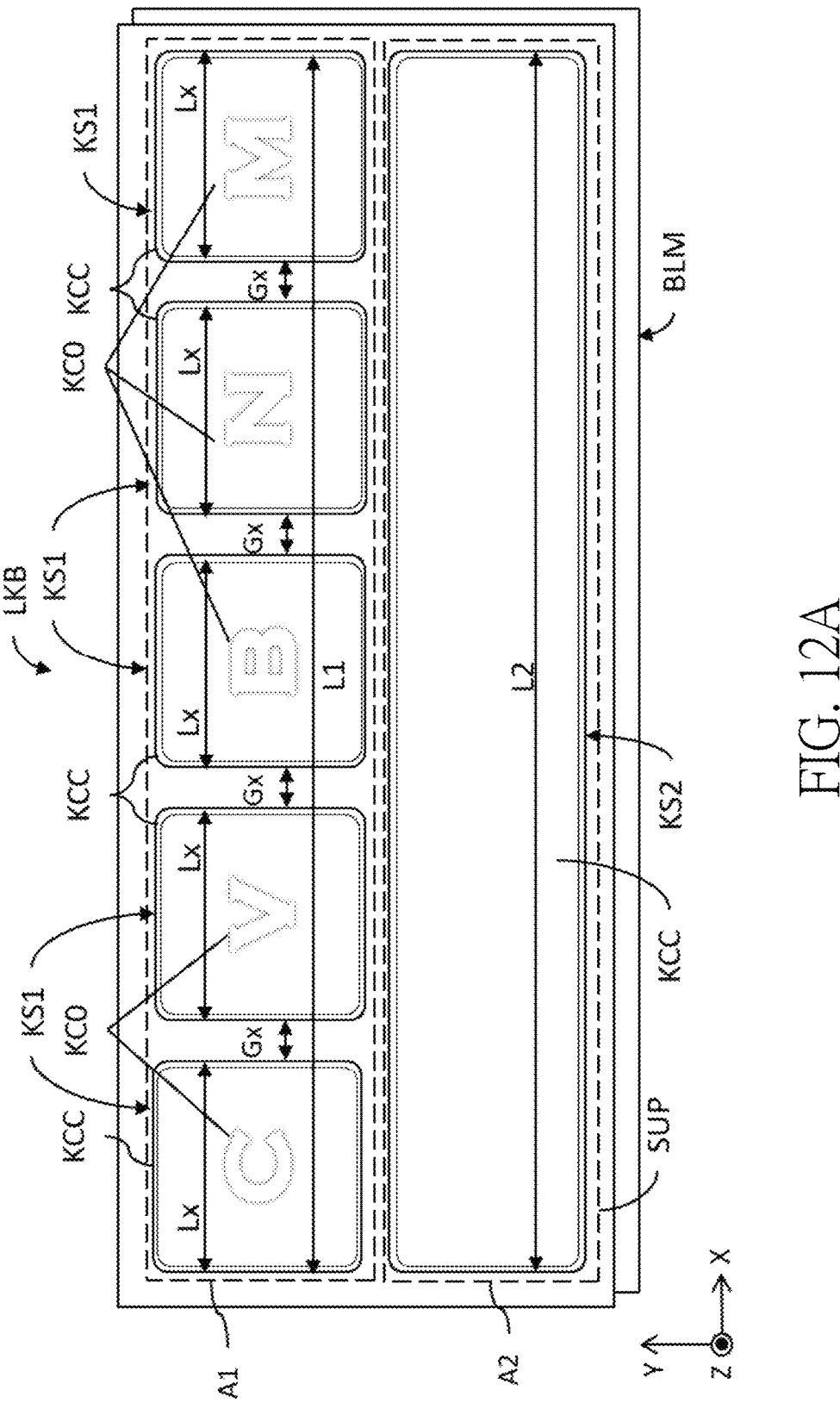
FIG. 12A is a partial exploded view illustrating a lighting keyboard according to another embodiment of the invention.
Figure 12B:
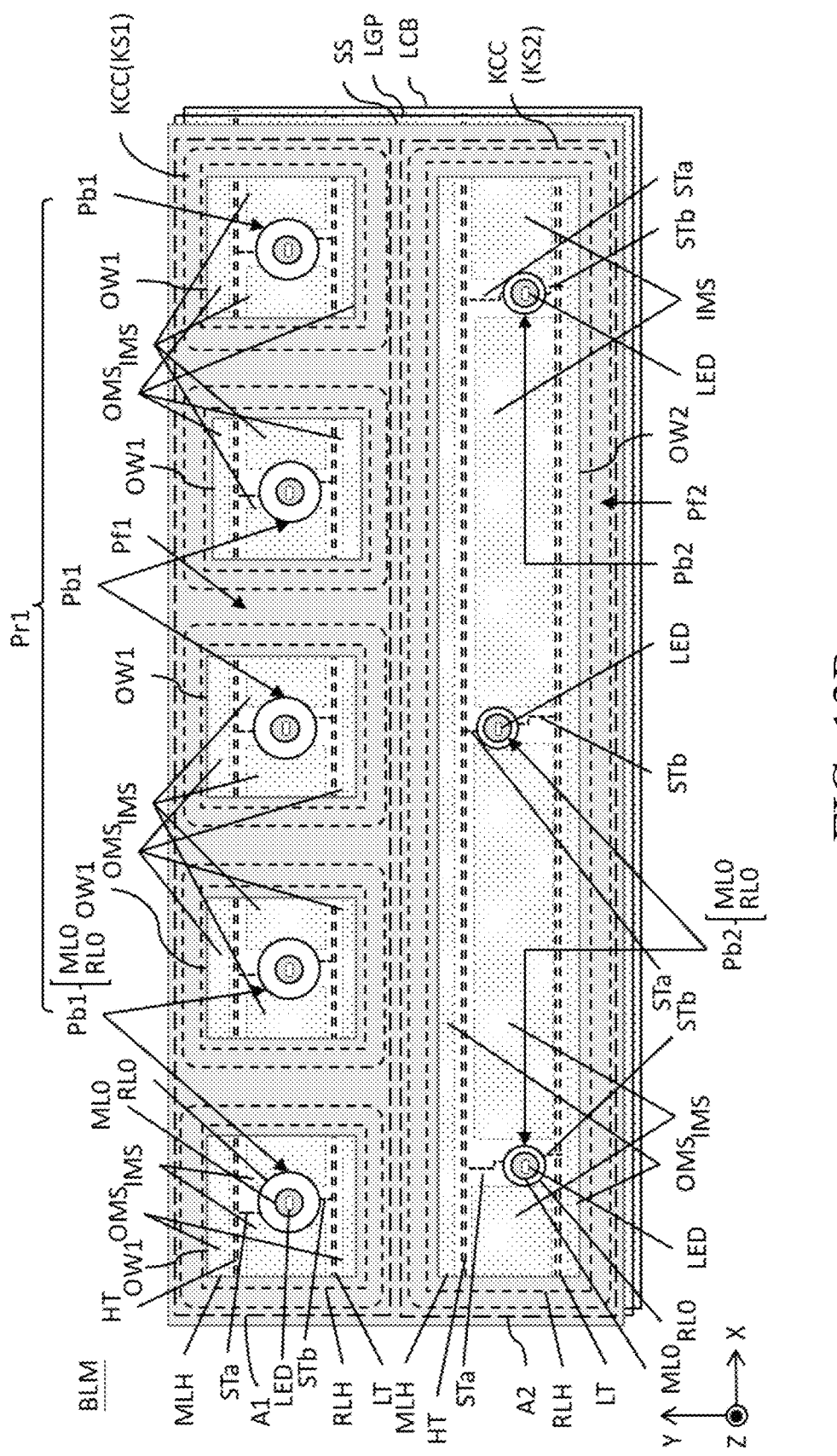
FIG. 12B is partial exploded view illustrating the backlight module shown in FIG. 12A according to an embodiment.
Figure 12C:
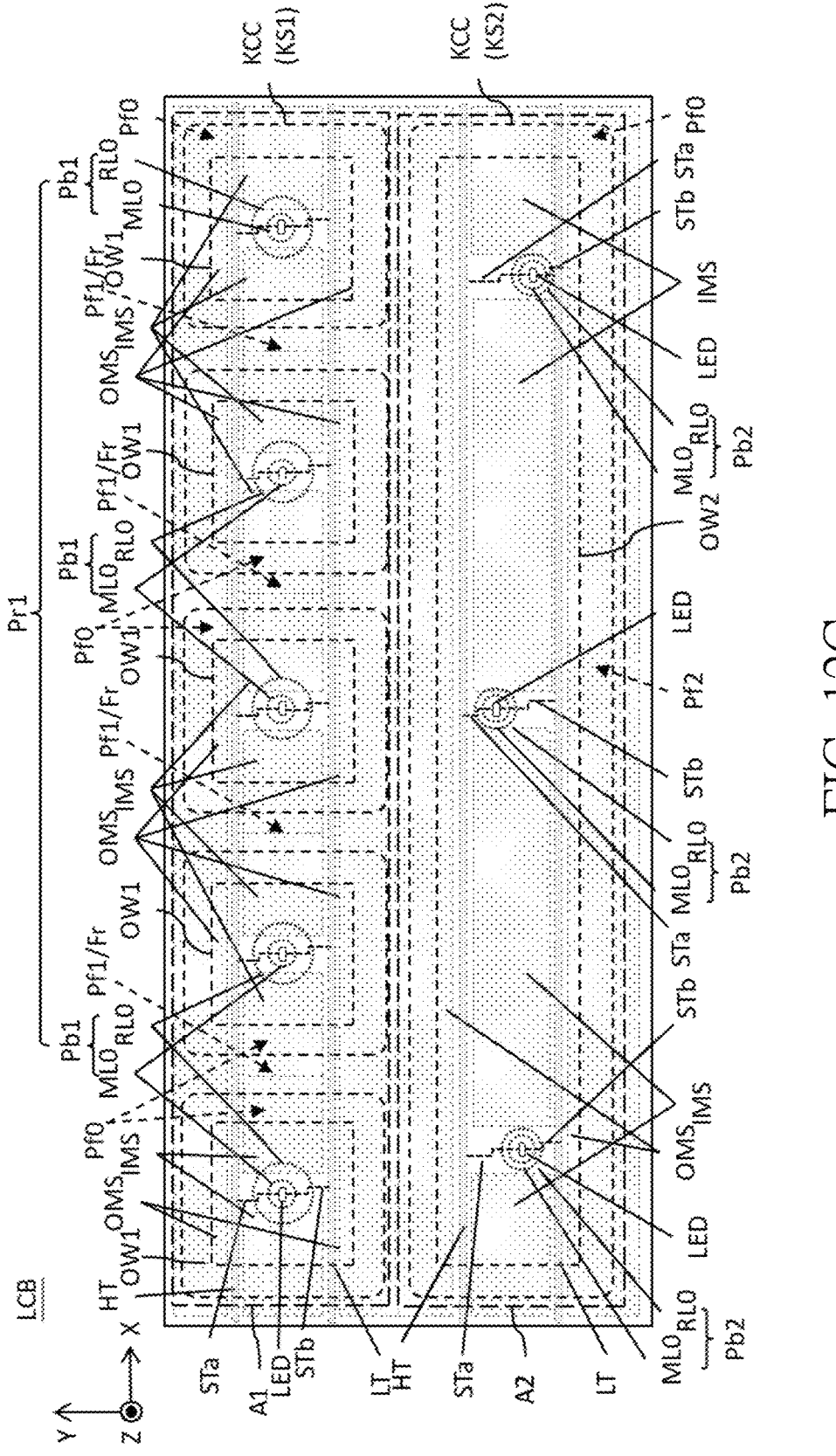
FIG. 12C is a partial top view illustrating the lighting board of the backlight module shown in FIG. 12B.
Figure 12D:
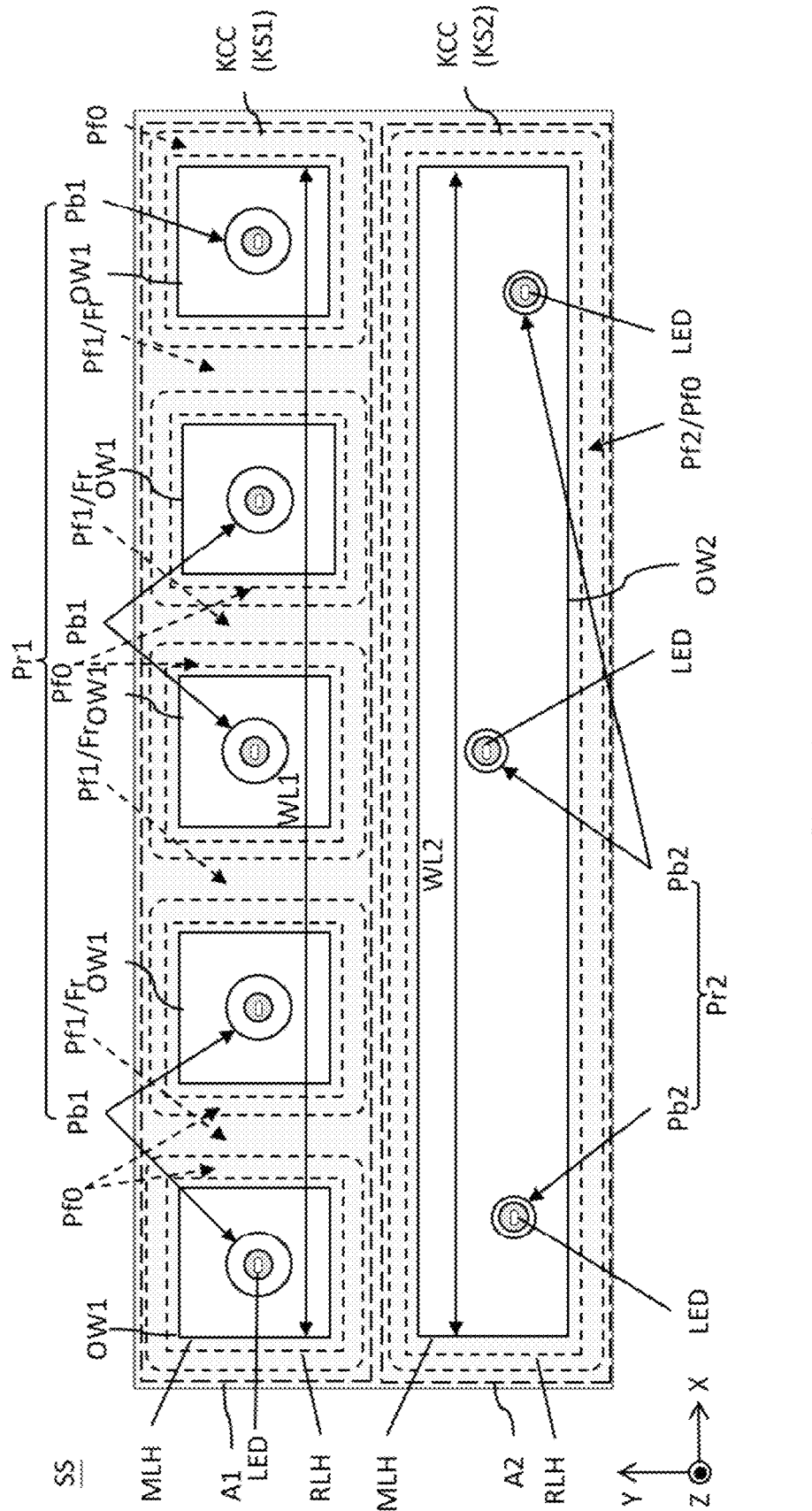
FIG. 12D is a partial top view illustrating the shielding sheet of the backlight module shown in FIG. 12B.

Referring to FIGS. 12A to 12D, FIG. 12A is a partial exploded view illustrating a lighting keyboard according to another embodiment of the invention, FIG. 12B is partial exploded view illustrating the backlight module shown in FIG. 12A according to an embodiment, FIG. 12C is a partial top view illustrating the lighting board of the backlight module shown in FIG. 12B, and FIG. 12D is a partial top view illustrating the shielding sheet of the backlight module shown in FIG. 12B.

In FIG. 12A, the upper row comprises five first keyswitches KS1 (characters C/V/B/N/M) corresponding to at least one keyswitch KS2 (space key) of the lower row. Although the areas of the keyswitches KS1 are the same and the areas of the keyswitches KS2 and KS1 are different, the overall periphery of the five square keys (keyswitch KS1) is similar in shape and size to the space key (keyswitch KS2). The key caps KCC of the five keyswitches KS1 have an inner outlet KC0 respectively, and there are no characters on the key cap KCC of the keyswitch KS2 that need to emit light. The contour halos of the keyswitch KS1 of the upper row and the keyswitch KS2 of the lower row will be illuminated around their own key skirts to show the boundaries of single keys. Furthermore, each of the contour halos of the five keyswitches KS1 of the upper row also jointly contribute to the overall peripheral boundary. The overall peripheral boundary of the five keyswitches KS1 of the upper row is almost symmetrical to the longer boundary of the keyswitch KS2 of the lower row. Since the key skirt of the key cap KCC is the light emitting position of the halo, this embodiment defines the peripheral joint area of the boundary of the key cap KCC of the five keyswitches KS1 of the upper row as a first halo area A1, and defines the boundary of the key cap KCC of the keyswitch KS2 as a second halo area A2. The areas of the first halo area A1 and the second halo area A2 are almost the same. The long side of the first halo area A1 is equivalent to the first long side L1 of the overall peripheral boundary of the five keyswitches KS1 of the upper row. However, since the five keyswitches KS1 are designed at intervals, the length of the first long side L1 is substantially equal to the side length Lx of five keycap plus four gaps Gx. The length of the long side of the second halo area A2 is equivalent to the length of the second long side L2 of the keyswitch KS2 of the lower row.

Referring to FIGS. 12B and 12D, on the shielding sheet SS, a plurality of first outlet windows OW1 (five) are defined to correspond to the positions of the five keyswitches KS1 and the first halo area A1 respectively, and the first outlet window OW1 may be achieved by any one of the reflective layer hole RLH or the mask layer hole MLH. In contrast, at least one second outlet window OW2 is defined to correspond to the position of the keyswitch KS2 of the lower row and the second halo area A2, and the second outlet window OW2 may also be achieved by any one of the reflective layer hole RLH or the mask layer hole MLH. The reflective layer hole RLH of the first outlet windows OW1 and the second outlet window OW2 may be larger than, smaller than or equal to the mask layer hole MLH, or only one of them is provided. Referring to FIGS. 9, 12B and 12D, on the reflective layer RL2 or the mask layer ML of the shielding sheet SS, a plurality of first outlet windows OW1 defines a first frame pattern Pf1, and the first frame pattern Pf1 comprises a plurality of first frame sections Pf0 (five) around the first outlet windows OW1. In contrast, at least one second outlet windows OW2 defines at least one second frame pattern Pf2, and the at least one second frame pattern Pf2 comprises at least one second frame section Pf0 around the at least one second outlet windows OW2. Since the short sides of the keyswitches KS1/KS2 are the same, the lengths of a first window length WL1 on the overall periphery of the first outlet windows OW1 and a second window length WL2 of the second outlet window OW2 are also the same, i.e. the first halo area A1 and the second halo area A2 corresponding to the first outlet window OW1 and the second outlet window OW2 have the same area or the same size.

In FIGS. 12B and 12D, the first frame pattern Pf1 and the second frame pattern Pf2 are different from each other. A plurality of first block pattern Pb1 forms a first row pattern Pr1, a plurality of second block patterns Pb2 forms a second row patterns Pr2, and the first row pattern Pr1 is different from the second row pattern Pr2. It seems impossible to obtain a contour halo in the second halo area A2 that approximates that of the first halo area A1. Intuitively, if a consistent overall contour halo is to be achieved, the second halo area A2 may be similar to the first halo area A1 by using five small second outlet windows OW2 corresponding to the five first outlet windows OW1. However, in this way, similar to the first frame pattern Pf1, four frame ribs Fr generated by the second frame pattern Pf2 cannot generate halos on the continuous boundary of the second halo area A2 of the space key (keyswitch KS2). That is to say, it cannot take into account the halo at the single-key boundary of the keyswitch KS2 itself. On the other hand, compared with the second halo area A2, the first halo area A1 may try to form only one integrated long and narrow first outlet window OW1 to cover the five keyswitches KS1. The disadvantage is that the four frame ribs Fr are missing, and two adjacent sides of the key cap KCC of the five keyswitches KS1 will be particularly bright. That is to say, it is impossible to take into account the halos at the five single-key boundary of the five keyswitches KS1. Thus, it is necessary to introduce additional technical solutions by the embodiments of the invention to solve the aforesaid problems. Referring to FIGS. 12B, 12C and 12D, each dotted line shows components located in other layers of the lighting keyboard LKB, or components without clear boundaries. The shielding sheet SS has a plurality of first block patterns Pb1 and a plurality of second block patterns Pb2 respectively disposed in the first outlet window OW1 and the second outlet window OW2. Each of the first block patterns Pb1 and the second block patterns Pb2 is composed of an inner mask section ML0 and/or an inner reflective section RL0 respectively. The inner mask section ML0 and/or the inner reflective section RL0 may be of equal size or one of them may be larger. The inner mask section ML0 and/or the inner reflective section RL0 may alternatively form the first block pattern Pb1 or the second block pattern Pb2. In the application of multi-color illuminant LED, each of the first block pattern Pb1 and the second block pattern Pb2 may further comprise a colored paint layer to assist light mixing.

The first block patterns Pb1 and the second block patterns Pb2 respectively overlap with the illuminants LED. Due to different numbers of illuminants LED in the two rows, the first block patterns Pb1 (five) are also different from the second block patterns Pb2 (three) in quantity. At the same time, the positions of the two rows of illuminants LED are also different, so the positions of the first block patterns Pb1 are also different from those of the second block patterns Pb2. Furthermore, the first block patterns Pb1 and the corresponding illuminants LED are relatively centered, but the second block patterns Pb2 and the corresponding illuminants LED are respectively closer to two long sides of the second outlet window OW2. Still further, the second block patterns Pb2 close to the first outlet window OW1 and the corresponding illuminants LED are fewer. This is because there will be a small amount of light passing through the light guide plate LGP from below the five keyswitches KS1 to the second outlet window OW2 below the keyswitch KS2, which may make up for the lack of side light. Each of the first block patterns Pb1 may be identical to each other, so as to improve the consistency of character light and contour halo between single keyswitches. However, each of the first block patterns Pb1 is different from the second block pattern Pb2 in order to achieve the purpose of uniform halo. For example, although the inner mask sections ML0 of the first block pattern Pb1 and the second block pattern Pb2 are similar in size, the first block pattern Pb1 has an inner reflective section RL0 with a larger diameter. This may be because the keyswitch KS1 needs to illuminate the inner outlet KC0 (character C/V/B/N/M), and the inner reflective section RL0 may prevent the inner outlet KC0 (character C/V/B/N/M) from emitting light too much and too dazzling. In contrast, the size of the inner reflective section RL0 of the second block pattern Pb2 is small. There is no concern about the inner outlet KC0, and it has to consider the single-key halo of the long side, short side and corner of the keyswitch KS2, i.e. the halo boundary of the second halo area A2, thereby allowing more light to be emitted directly. For example, various micro-structure regions MS or micro-structure layers MSL on the first reflective layer RL1 of the light guide plate LGP or the lighting board LCB mentioned in the aforesaid embodiments may increase the light output through the second outlet window OW2.

For the single-key contour halo of the multiple key such as the keyswitch KS2, the transmission of the light in the light guide plate LGP toward the distance may be a first light path (delayed upward light emission) and this is necessary for the application of low-brightness illuminant LED. A second light path is to allow the light to emit upward earlier, which may be reflected and diffused between the key cap KCC of the keyswitch KS2 without characters and the support plate SUP, or between the key cap KCC and the first reflective layer RL1 of the lighting board LCB (a part exposed to the second outlet window OW2), and finally the light comes out from the gap between the key cap KCC of the keyswitch KS2 and the support plate SUP. It is also possible to generate a single-key halo for the keyswitch KS2, or it may means the contour halo of the second halo area A2. Secondly, in the exposed area of the light guide plate LGP or the first reflective layer RL1 of the lighting board LCB under the second outlet window OW2, a micro-structure region MS (or micro-structure layer MSL) may be disposed to overlap with the second outlet window OW2 to allow light to enter the second light path. Thus, the edge of the micro-structure region MS close to the second outlet window OW2 may provide the light of the first light path to be emitted later; and the micro-structure region MS close to the second block pattern Pb2 may provide the light of the second light path to be emitted earlier. The micro-structure region MS/micro-structure layer MSL disposed on the first reflective layer RL1 of the lighting board LCB has a significant influence. Because the lateral transmission distance of light is limited in the application of low-brightness illuminant LED, the recycling of light is very important. Furthermore, because the second outlet window OW2 covers 2 fewer illuminants LED than the first outlet window OW1, the micro-structure region MS/micro-structure layer MSL on the first light reflective layer RL1 of the lighting board LCB may recycle light and assist light output, thereby making up for the lack of light guide plate LGP.

After all, for the keyswitch KS2 without characters, the second block pattern Pb2 or the second row pattern Pr2 is completely unnecessary to shield the illuminant LED from emitting light. The existence of the second block pattern Pb2 or the second row pattern Pr2 helps to adjust the ratio of the illuminant LED passing through the first light path or the second light path in the second outlet window OW2. Thus, on the premise of lacking other conditions, this embodiment uses different arrangements of the first row pattern Pr1 and the second row pattern Pr2 to achieve the purpose of uniformity of the contour halo.

FIG. 12C shows the arrangement of circuit and micro-structure regions MS on the lighting board LCB. Two pair of main traces HT/LT pass through five keyswitches KS1 of the upper row and one keyswitch KS2 of the lower row. A plurality of first block patterns Pb1 are located between one pair of main traces HT/LT, and a plurality of second block patterns Pb2 are located between the other pair of main traces HT/LT. In fact, each first block pattern Pb1 and each second block pattern Pb2 are located between a pair of sub-traces STa/STb. As in the aforesaid embodiment, the arrangement of the micro-structure does not overlap with the main/sub-traces HT/LT or STa/STb, the first block patterns Pb1 are located between a pair of outer micro-structure regions OMS, and the second block patterns Pb2 are also located between another pair of outer micro-structure regions OMS. These outer micro-structure regions OMS are located beyond a pair of main traces HT/LT. At the same time, each first block pattern Pb1 is also located between a pair of inner micro-structure regions IMS, and each second block pattern Pb2 is also located between another pair of inner micro-structure regions IMS. These inner micro-structure regions IMS are located between a pair of main traces HT/LT and located at opposite sides of a pair of sub-traces STa/STb. The inner/outer micro-structure regions IMS/OMS on the first reflective layer RL1 of the lighting board LCB may assist in recycling the light emitted from the light guide plate LGP back to the light guide plate LGP. Since the inner/outer micro-structure regions IMS/OMS have a full range of reflection/diffusion effects, it also has the effect of indirectly increasing light output from the light guide plate LGP.

As mentioned in the above, the embodiments shown in FIGS. 12A, 12B, 12C and 12D provide a backlight module BLM comprising the lighting board LCB and the shielding sheet SS. The lighting board LCB comprises a plurality of illuminants LED aligned into two rows. The shielding sheet SS comprises a plurality of first outlet windows OW1 and a plurality of first block patterns Pb1 disposed within the first outlet windows OW1 respectively. Each of the first block patterns Pb1 respectively corresponds to one of the illuminants LED. The first block patterns Pb1 form a first row pattern Pr1. The shielding sheet SS further comprises at least one second outlet window OW2 and a plurality of second block patterns Pb2 disposed within the at least one second outlet window OW2. Each of the second block patterns Pb2 respectively corresponds to one of the illuminants LED. The second block patterns Pb2 form a second row pattern Pr2. A first window length WL1 of an entire contour of the first outlet windows OW1 is as long as a second window length WL2 of the at least one second outlet window OW2, and the first row pattern Pr1 is different from the second row pattern Pr2. The lighting board LCB may comprise a pair of non-intersecting main traces HT-LT or a pair of non-intersecting sub-traces STa-STb, and the first row pattern Pr1 is at least partially located between the pair of traces HT-LT (or STa-STb). The lighting board LCB may comprise a pair of micro-structure regions OMS-OMS or IMS-IMS apart from each other, and at least one of the first block patterns Pb1 is located between the pair of micro-structure regions OMS-OMS or IMS-IMS. Moreover, the backlight module BLM is adapted to the lighting keyboard LKB with at least one first keyswitch KS1 and at least one second ketswitch KS2. The at least one second keyswitch KS2 is arranged parallel to the at least one first keyswitch KS1. A first long side of an entire contour of the at least one first keyswitch is identical to a second long side of the at least one second keyswitch, and the first row pattern is different from the second row pattern.

Furthermore, FIG. 12C discloses a lighting board LCB integrated with a shielding sheet SS. The lighting board LCB comprises a shielding sheet SS, a plurality of illuminants LED aligned into two rows, a first pair of non-intersecting traces HT-LT (or STa-STb) and a second pair of non-intersecting traces HT-LT (or STa-STb). The shielding sheet SS comprises a plurality of first outlet windows OW1 and a plurality of first block patterns Pb1 disposed within the plurality of first outlet windows OW1 respectively. Each of the first block patterns Pb1 respectively corresponds to one of the illuminants LED. The first block patterns Pb1 form a first row pattern Pr1. The shielding sheet SS further comprises at least one second outlet window OW2 and a plurality of second block patterns Pb2 disposed within the at least one second outlet window OW2. Each of the second block patterns Pb2 respectively corresponds to one of the illuminants LED. The second block patterns Pb2 form a second row pattern Pr2. The first row pattern Pr1 is located between the first pair of non-intersecting traces HT-LT (or STa-STb), the second row pattern Pr2 is located between the second pair of non-intersecting traces HT-LT (or STa-STb), and the first row pattern Pr1 is different from the second row pattern Pr2.

Figure 13A:
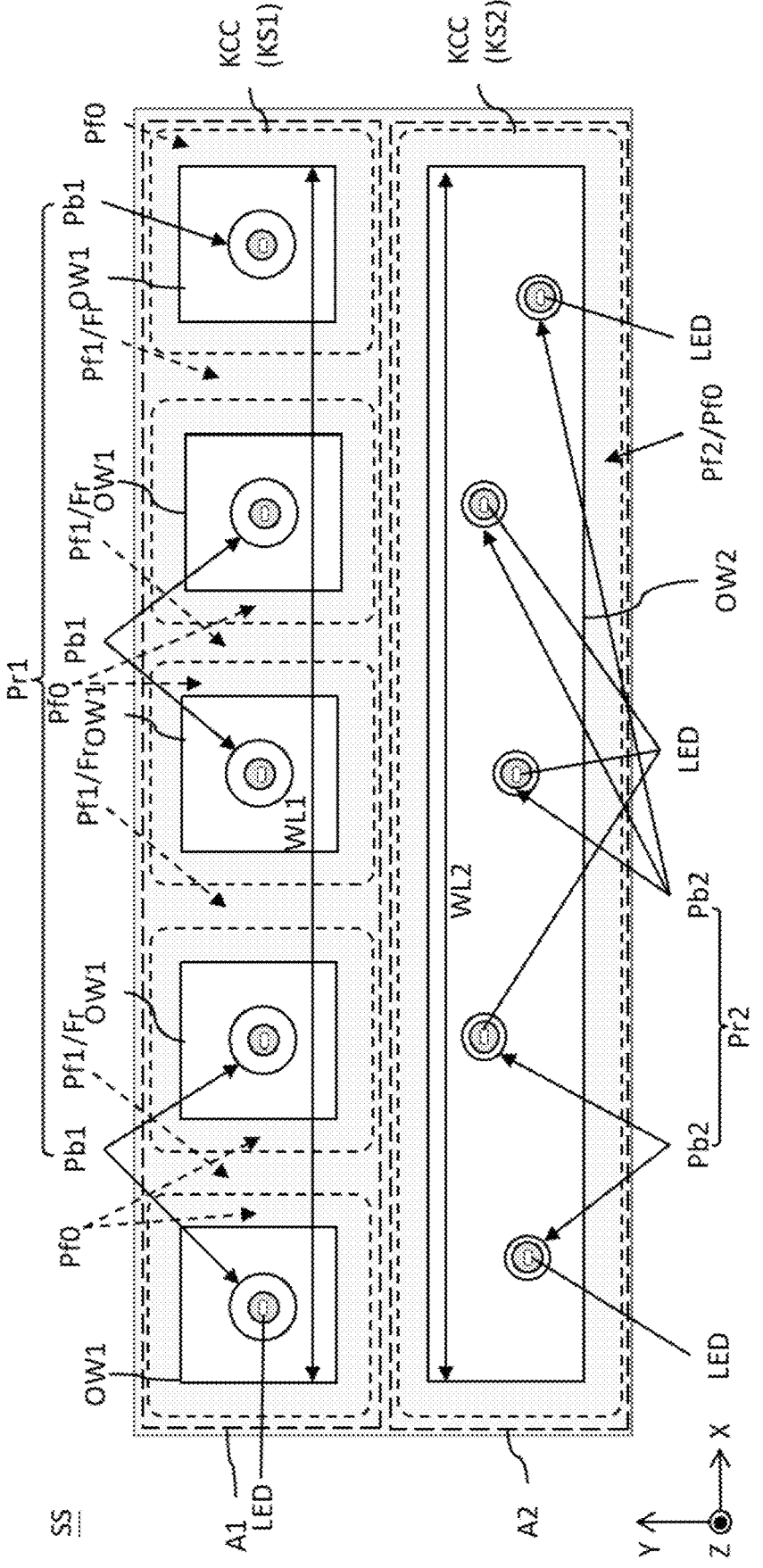
FIG. 13A is a partial top view illustrating the shielding sheet shown in FIG. 12B according to a derivative embodiment.
Figure 13B:
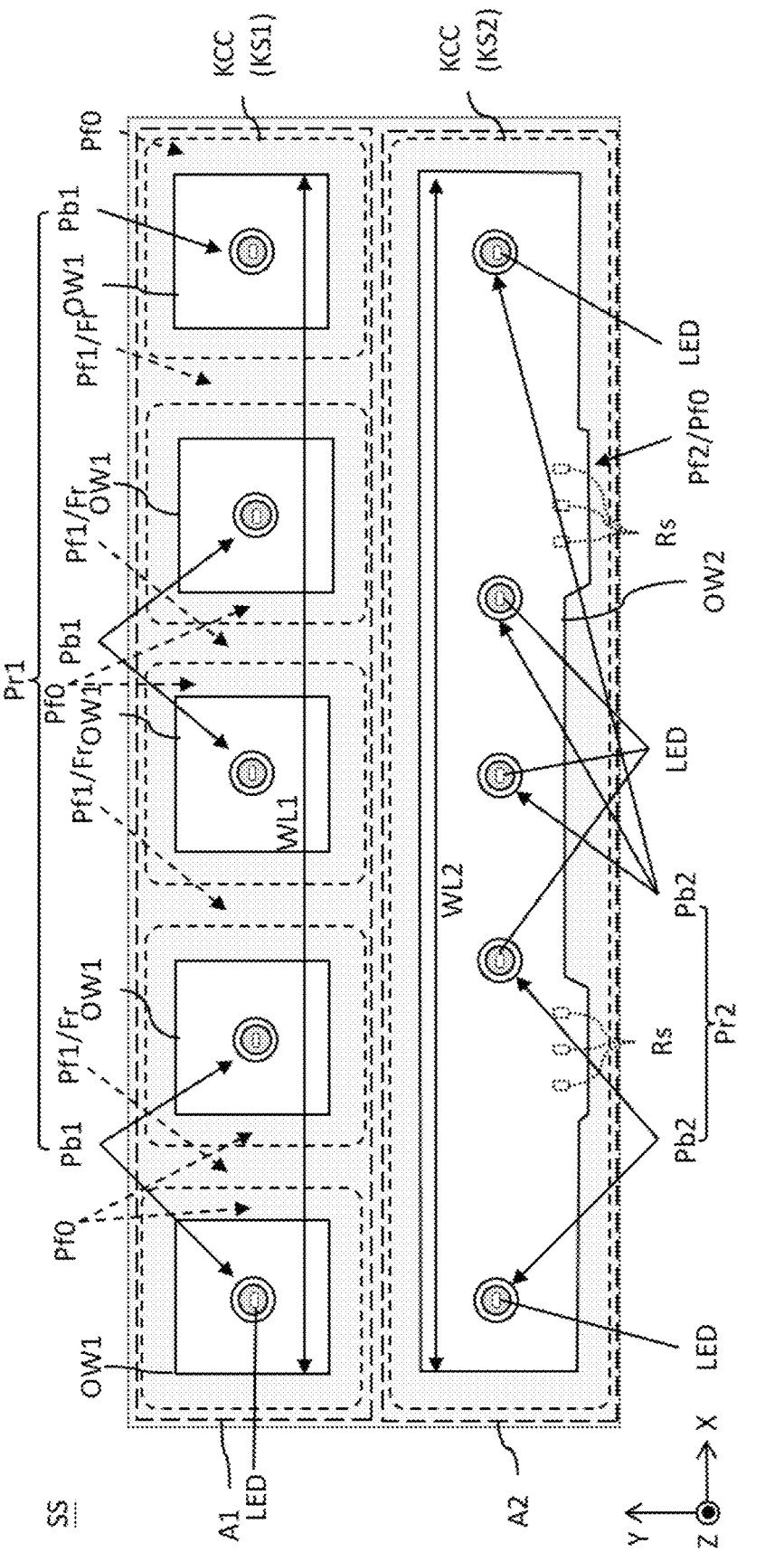
FIG. 13B is a partial top view illustrating the shielding sheet shown in FIG. 12B according to a derivative embodiment.
Figure 13C:
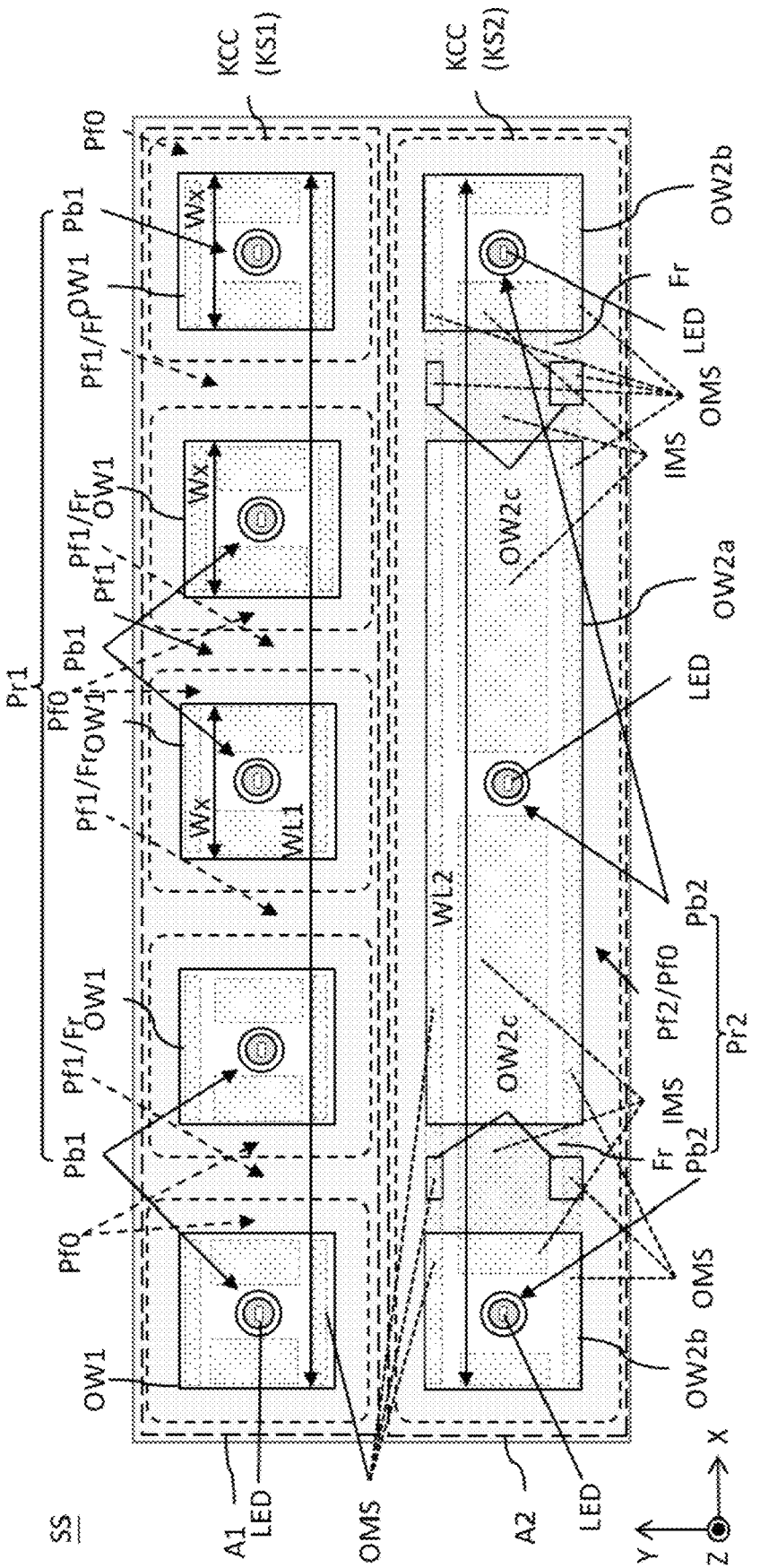
FIG. 13C is a partial top view illustrating the shielding sheet shown in FIG. 12B according to a derivative embodiment.
Figure 13D:
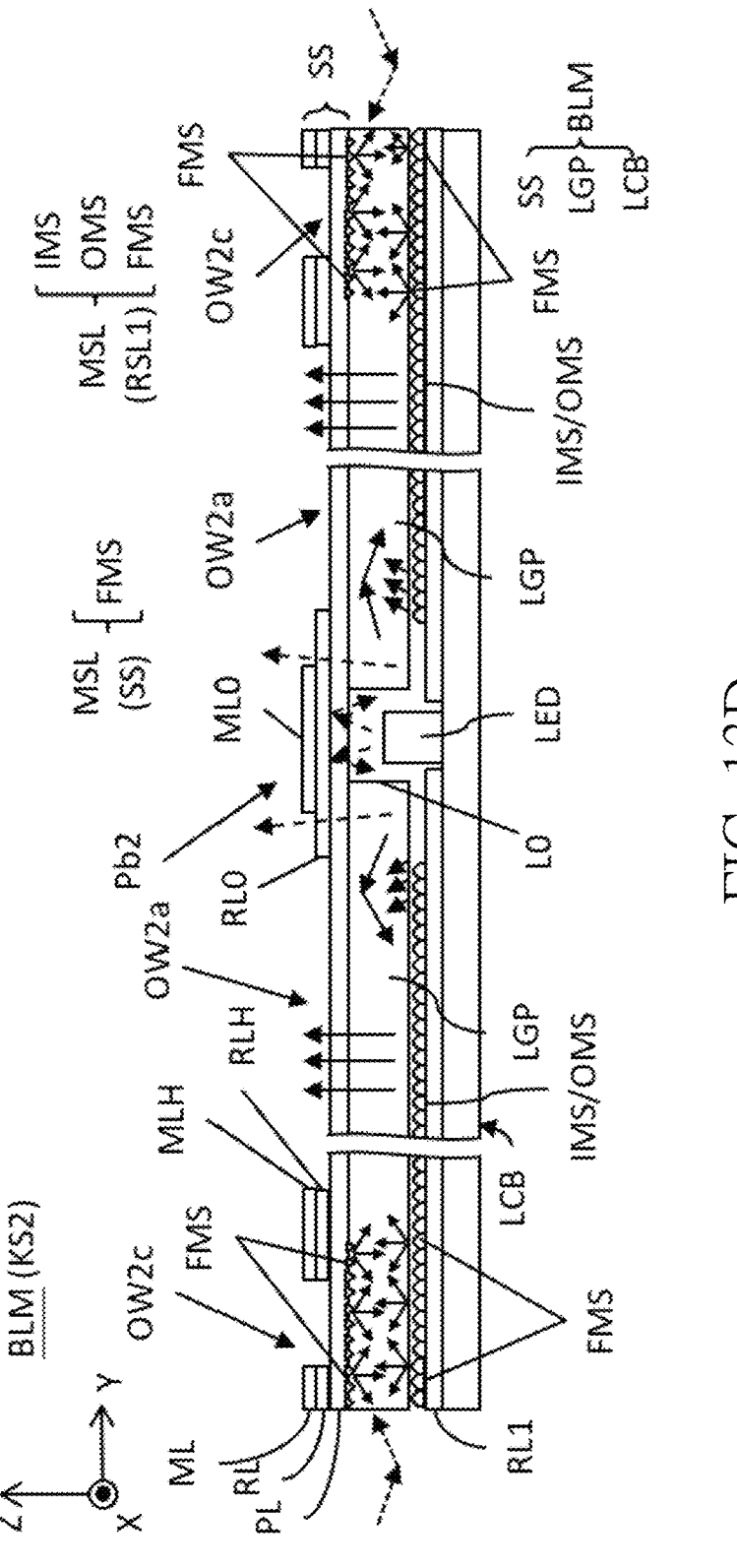
FIG. 13D is a partial sectional view illustrating the shielding sheet shown in FIG. 13C according to a derivative embodiment.

The following introduces various derivative embodiments of the shielding sheet SS shown in FIGS. 12B and 12D. FIG. 13A is a partial top view illustrating the shielding sheet shown in FIGS. 12B and 12D according to a derivative embodiment. FIG. 13B is a partial top view illustrating the shielding sheet shown in FIGS. 12B and 12D according to a derivative embodiment. FIG. 13C is a partial top view illustrating the shielding sheet shown in FIGS. 12B and 12D according to a derivative embodiment. Among the figures, if there is a dotted line, it shows the components located in other layers of the lighting keyboard LKB. FIG. 13D is a partial sectional view illustrating the shielding sheet shown in FIG. 13C according to a derivative embodiment.

Referring to FIG. 13A, the second block patterns Pb2 of the second outlet window OW2 of the shielding sheet SS are divided into a first group and a second group, which are respectively arranged upward and downward. A number of the first group of second block patterns far away from a plurality of first outlet windows OW1 is larger than a number of the second group of at least one second block pattern Pb2 close to the plurality of first outlet windows OW1. A number of the illuminants LED corresponding to the first group of second block patterns is also larger than a number of the illuminants LED corresponding to the second group of at least one second block pattern Pb2. This characteristic trend is consistent with FIGS. 12B and 12D. The difference is that the number of the first block pattern Pb1 and the second block pattern Pb2 in FIG. 13A are the same, and the number of corresponding illuminants LED is also the same. In other words, there are two more illuminants LED within the range of the second outlet window OW2. If necessary, the arrangement of the micro-structure region MS in the second outlet window OW2 in FIG. 13A may reduce the density or area, or the proportion of light emitted through the first light path and the second light path may be adjusted in accordance with the increase in the number of illuminants LED. Furthermore, even if the numbers are the same, in the direction of the long axis of the second outlet window OW2, the distribution of the second block patterns Pb2 does not need to correspond to the first block patterns Pb1 one by one, and a peripheral overall contour halo consistent with the first outlet window may still be provided.

Referring to FIG. 13B, even if the number and shape of the first frame pattern Pf1 and the second frame pattern Pf2 are the same, the first row pattern Pr1 and the second row pattern Pr2 may be different from each other due to different positions. The number of the first block pattern Pb1 and the second block pattern Pb2 in FIG. 13B are the same, the number of corresponding illuminants LED is also the same, and this is the same as FIG. 13A. In FIGS. 13A, 12B and 12D, the first block pattern Pb1 is different from the second block pattern Pb2, but the first block pattern Pb1 and the second block pattern Pb2 shown in FIG. 13B are the same. Still further, two of the second block patterns Pb2 (and two illuminants LED thereof) located at relatively outer sides and two of the first block patterns Pb1 (and two illuminants LED thereof) located at relatively outer sides in the first outlet window OW1 correspond to each other, or even completely symmetrical. Such an arrangement helps the brightness of four outer corner halos of the second outlet window OW2 to be closer to the brightness of four outer corner halos of the first outlet windows OW1 as a whole. In addition, the second frame pattern Pf2 has one or more openings OP corresponding to one or more non-luminous components Rs on the lighting board LCB. Since the non-luminous components Rs occupy the space of the first reflective layer RL1 and the outer micro-structure region OMS, the light output there may not be bright enough, thereby resulting in a part of the contour halo is too weak. The opening OP exposes more area of the first reflective layer RL1 of the lighting board LCB or exposes more area of the light guide plate LGP, such that it may cooperate with the micro-structure layer MSL on the first reflective layer RL1 or the light guide plate LGP to make up for the insufficiency of the contour halo. The distance between three second block patterns Pb2 in the middle section of the second outlet window OW2 is relatively small, and this is to avoid the illuminant LED under two second block patterns Pb2 from being too close to the non-luminous component Rs. Since some holes may be formed on the light guide plate LGP to accommodate these non-luminous components Rs, it means that there will be light leakage concerns, and the light guide plate LGP cannot dispose the micro-structure region MS there. Keeping a distance between the illuminant LED and the non-luminous component Rs may avoid unnecessary light leakage there. In this way, the distance between the three illuminants LED is relatively small, as is the distance between the corresponding three second block patterns Pb2.

Please Refer to FIGS. 13C, 13D and 12D. In FIG. 12D, the first frame pattern Pf1 is different from the second frame pattern Pf2. However, in practice, since four corner halos of the first halo area A1 and the second halo area A2 have a decisive effect on defining the halo boundary, the first frame pattern Pf1 and the second frame pattern Pf2 may also be partially identical at four corners. For example, the original narrow second outlet window OW2 of the second frame pattern Pf2 in FIG. 12D may be shortened to the second outlet window OW2a in FIG. 13C, and two smaller second outlet windows OW2b similar to the first outlet window OW1 may be connected on the left and right. Since the shape and size of the two second outlet windows OW2b correspond to the first outlet window OW1, it can ensure that the four corner halos of the second halo area A2 may be highly close to the four corner halos of the first halo area A1. In FIG. 13C, the first frame pattern Pf1 and the second frame pattern Pf2 are set to be partially identical at the four corners, which may bring about the effect of uniform halo at the corners. The disadvantage is that the two frame ribs Fr generated by two sides of the second frame pattern Pf2 in accordance with the first frame pattern Pf1 are located between the second outlet windows OW2a and OW2b. The frame rib Fr cannot generate the halo at the continuous boundary of the second halo area A2 of the space key (keyswitch KS2). In this embodiment, a plurality of second supplementary light windows OW2c are provided at two additional frame ribs Fr corresponding to the second outlet window OW2. At the same time, the light guide plate LGP may be provided with a micro-structure layer MSL to at least partially overlap with the second supplementary light window OW2c to assist light output. In this way, the insufficiency of the contour halo at this area may be compensated, and a relatively continuous and consistent halo boundary may be provided together with the second outlet windows OW2a and OW2b. The light of these second supplementary light windows OW2c may come from the illuminant LED in the middle or the illuminants LED on both sides. The micro-structure layer MSL may also be disposed on the lighting board LCB. The inner/outer micro-structure region IMS/OMS of the micro-structure layer MSL overlaps with the frame rib Fr to help recycle the light, and let the light return to the light guide plate LGP to be emitted upward or be transmitted farther.

However, in FIG. 13C, the larger second outlet window OW2a only corresponds to one illuminant LED, but it has to illuminate a halo boundary nearly as large as the three illuminants LED of the three first outlet windows OW1 in the middle. Although there is no need to illuminate the characters (keyswitch KS2 in FIG. 12A), the combination of the low-brightness illuminant LED and the light guide plate LGP still tends to cause insufficient light after lateral transmission. Thus, it is necessary to increase the micro-structure layer MSL to recycle the light as much as possible. Referring to FIG. 13D, the micro-structure layer MSL may be disposed on the lower surface of the shielding sheet SS (e.g. frame micro-structure region FMS) and on the lighting board LCB (e.g. inner/outer micro-structure region IMS/OMS). Two micro-structure layers MSL of the shielding sheet SS and the lighting board LCB may recover more escaped light back to the light guide plate LGP. Especially, the micro-structure layer MSL of the light guide plate LGP may only appear in the second supplementary light window OW2c. The two micro-structure layers MSL of the shielding sheet SS and the lighting board LCB may overlap with the frame rib Fr, which helps to recycle the light that escapes from the frame rib Fr and returns to the light guide plate LGP. The micro-structure layer MSL overlapping with the frame rib Fr may be regarded as the frame micro-structure region FMS no matter it is disposed at the micro-structure region LMS of the light guide plate LGP or at the inner/outer micro-structure region IMS/OMS of the lighting board LCB. The frame micro-structure region FMS may be disposed on the shielding sheet SS. In practice, a part of the reflective layer RL may form a micro-structure with a diffusion effect, or a layer of micro-structure region MS may be independently disposed under the reflective layer RL. For example, the reflective layer RL uses ink with larger reflective particles, and when the reflective layer RL is sprayed or printed, concave/convex areas or irregular uneven reflective surfaces are formed simultaneously, so as to allow the reflective layer RL itself to form a micro-structure region MS. Alternatively, a layer of ink or paint may be sprayed or printed under the reflective layer RL to be an additional micro-structure region MS. The micro-structure regions MS disposed on the shielding sheet SS do not need to be of regular shape or fixed density, as long as they are easy to be adjusted through the process (such as printing ink).

Figure 14A:
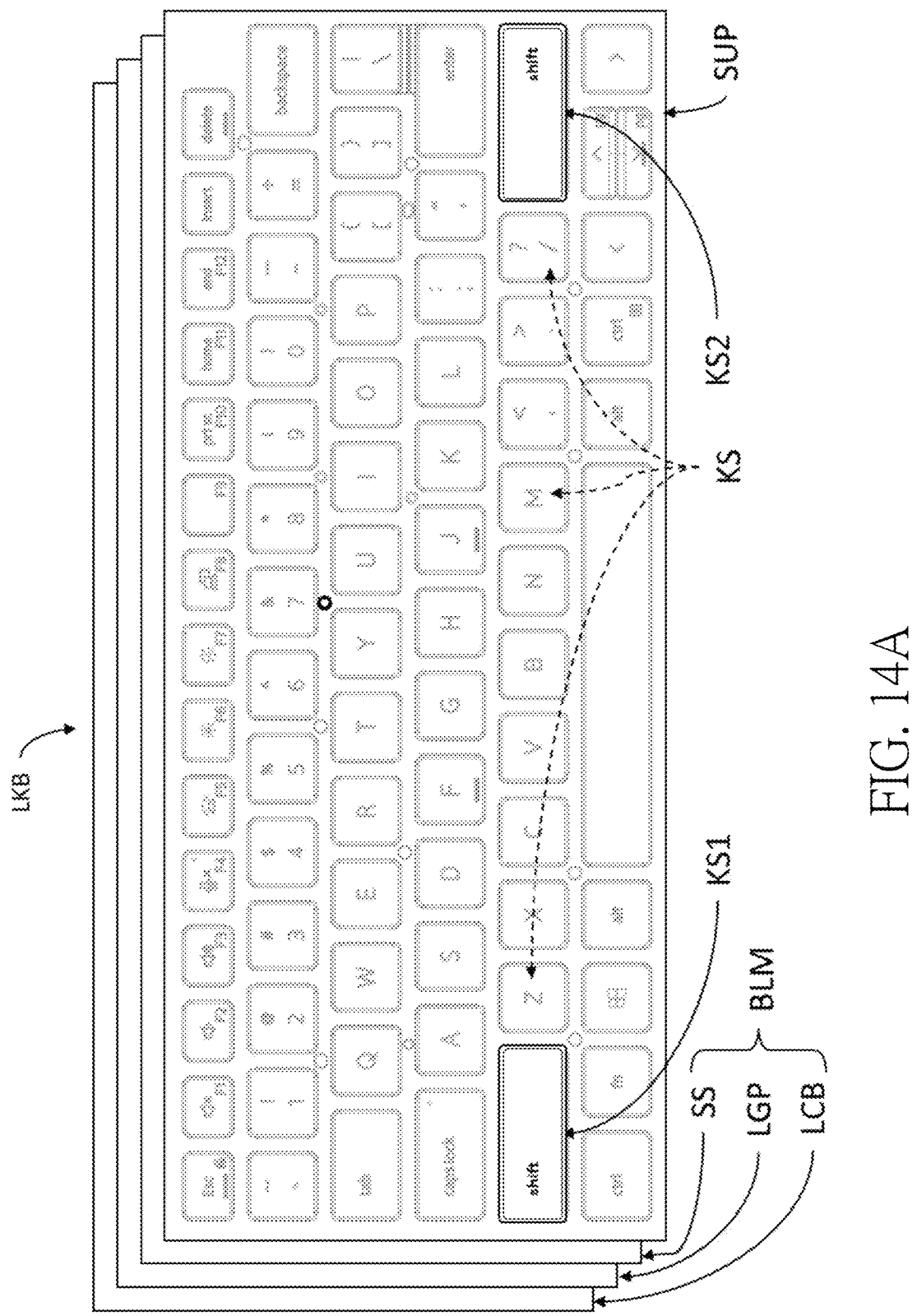
FIG. 14A is a schematic view illustrating a lighting keyboard according to another embodiment of the invention.
Figure 14B:
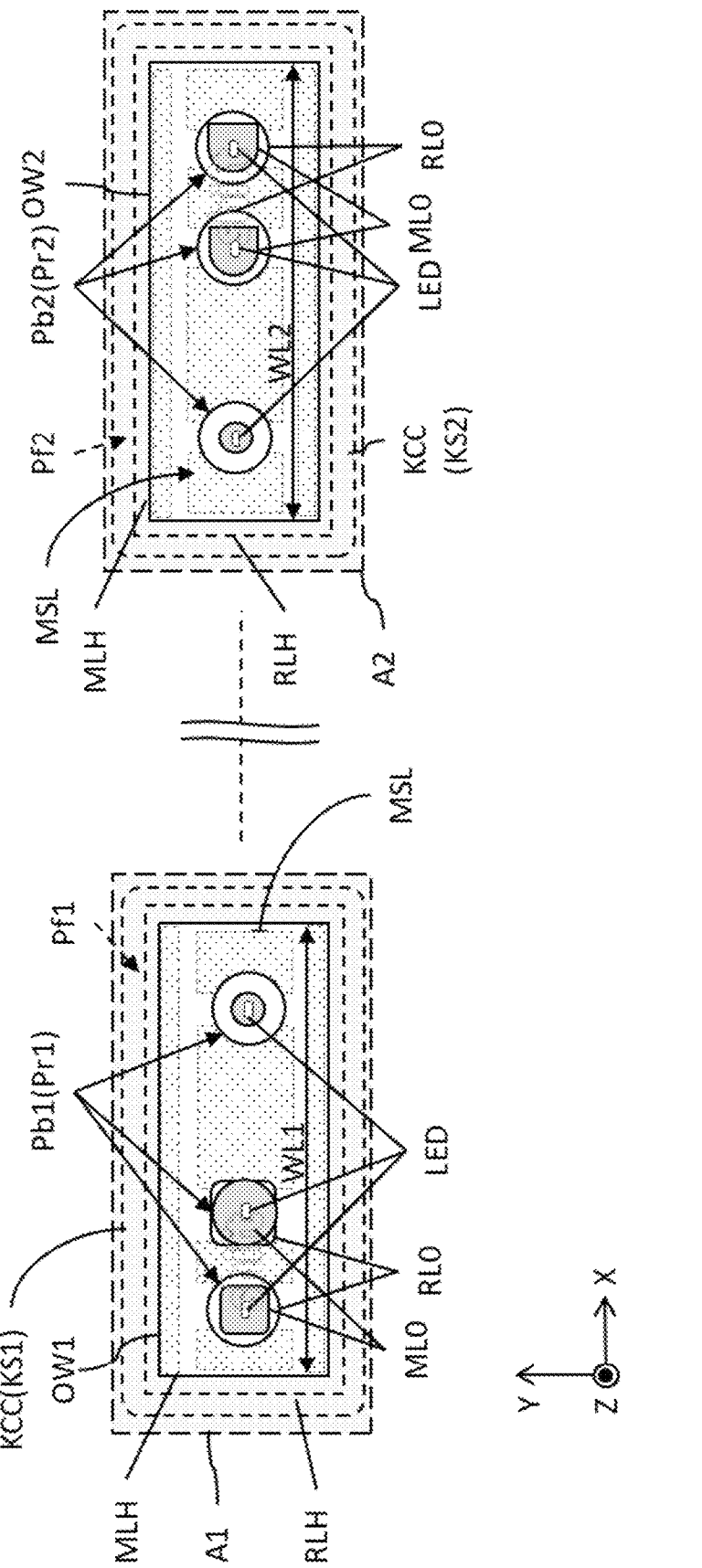
FIG. 14B is a partial top view illustrating the shielding sheet shown in FIG. 14A according to an embodiment.

The following embodiments relate to two similar keyswitches KS1/KS2 symmetrically arranged on the lighting keyboard LKB. Referring to FIGS. 14A and 14B, FIG. 14A is a schematic view illustrating a lighting keyboard according to another embodiment of the invention, and FIG. 14B is a partial top view illustrating the shielding sheet shown in FIG. 14A according to an embodiment.

The first keyswitch KS1 (e.g. left Shift key) and the second keyswitch KS2 (e.g. right Shift key) are two multiple keys on the same straight line (in a broad sense, they are also parallel to each other), both are separated by a plurality of square keys (keyswitch KS), and the keyswitches KS1/KS2 have an outlet corresponding to the key cap KCC (character "shift"). The keyswitches KS1/KS2 are respectively located on the opposite sides of the lighting keyboard LKB (FIG. 14B omits all keyswitches between the two keyswitches). Due to the symmetrical position and similar size and shape, intuitively, the first outlet window OW1 and the second outlet window OW2 corresponding to the keyswitches KS1/KS2 should be provided with a symmetrical first block pattern Pb1 and a second block pattern Pb2, but it is not actually the case. The symmetrical first block pattern Pb1 and the second block pattern Pb2 instead make the first outlet window OW1 and the second outlet window OW2 generate non-uniform and unsymmetrical halos. For example, the illuminants LED corresponding to the keyswitches KS1/KS2 belong to different parallel groups on the lighting board LCB, and slight differences in voltage and current lead to differences in brightness of the illuminants LED of the keyswitches KS1/KS2. Even if the illuminants LED corresponding to the keyswitches KS1/KS2 are in the same group on the lighting board LCB, the voltage and current supplied to the illuminants LED may be different due to poor design of the feed-in points of the high-voltage trace and the low-voltage trace. Alternatively, because the main traces on both sides of the lighting board LCB are usually collected side by side, or a large space is required for arranging non-luminous components, they will be excluded to the corresponding optical design of the keyswitches KS1/KS2. Secondly, in the booming industry trend of gaming keyboard, the keyswitches W/A/S/D adjacent to the keyswitch KS1 are regarded as game operation keyswitches, and an exclusive design is given to the optics and circuit, which also makes the adjacent keyswitch KS1 must deal with some level of negative effects. Furthermore, on a large-sized keyboard (e.g. corresponding to a 15 to 17-inch screen), the right Shift key (keyswitch KS2) is not a real boundary keyswitch, and there may be number keys on the right side, such that the keyswitches KS1/KS2 will also have different backlight designs because only one of them is a boundary keyswitch. The more basic factor may also be that the low-brightness illuminant LED is widely used in each keyswitch KS of the lighting keyboard LKB. Excessive quantity (e.g. 100 or so), too many groups of parallel traces (e.g. 15 to 20 groups) and the influence of the resistance of the trace itself (e.g. printed silver paste trace) will cause inconsistencies in the basic voltage/current. In the end, it is difficult to adjust the brightness of each illuminant LED to the same brightness. To solve the aforesaid problems, the embodiment of the invention chooses to adjust the first block pattern Pb1 and the second block pattern Pb2 of the shielding sheet SS as a solution. The advantage is that the shielding sheet SS is made by a printing process, it is easy to change the design, and the cost is relatively low, which is better than the light guide plate LGP or the lighting board LCB of the backlight module BLM.

In FIGS. 14A and 14B, the reflective layer holes RLH of the two keyswitches KS1/KS2 correspond to each other, and the mask layer holes MLH are also symmetrical to each other. The first halo area A1 corresponds to the key cap KCC of the keyswitch KS1, the second halo area A2 corresponds to the key cap KCC of the keyswitch KS2, and the size, shape and area of the two halo areas are similar. Similarly, the corresponding first frame pattern Pf1 and second frame pattern Pf2 have similar size, shape and area. The first outlet window OW1 and the second outlet window OW2 have similar size, shape and area, wherein the first window length WL1 and the second window length WL2 are the same or different from each other between 2%-25%. In FIGS. 14A and 14B, the character "shift" is on the outside, so the arrangement of the three illuminants LED is that two of them are closer to the character and on the outside, and the corresponding two first block patterns Pb1 and two second block patterns Pb2 are also on the outside. The two first block patterns Pb1 and the two second block patterns Pb2 corresponding to the characters are also close to the short sides of the first outlet window OW1 and the second outlet window OW2. The shapes of the first block pattern Pb1 and the second block pattern Pb2 (i.e. the shape of the inner mask section ML0 and/or the inner reflective section RL0) may have one or more straight sides and are partially parallel to the short sides and the ends of two long sides of the first outlet window OW1 and the second outlet window OW2, and it helps provide a consistent contour halo. The first block pattern Pb1 in the middle even has the largest area of the inner mask section ML0. For example, because the corresponding illuminant LED is the one closest to the feed-in point of the high-voltage trace, the illuminant LED has higher brightness due to the larger current and voltage, and requires a larger area of the inner mask section ML0 to fine-tune the light. In addition to the various factors mentioned above, the two first block patterns Pb1 and the two second block patterns Pb2 corresponding to the characters must also take into account the uniformity of character brightness and halo brightness. Thus, the first block pattern Pb1 is different from the second block pattern Pb2, even the three first block patterns Pb1 are different from each other, and the three second block patterns Pb2 are also different from each other. Finally, the first row pattern Pr1 is different from the second row pattern Pr2.

In addition, the use of the micro-structure layer MSL can be used to adjust the halo boundary uniformity contributed by the first outlet window OW1 and the second outlet window OW2. If the micro-structure layer MSL is disposed on the light guide plate LGP, partial density of the micro-structure region MS may be used to directly change partial light output. If the micro-structure layer MSL is disposed on the shielding sheet SS (only overlapping with the first frame pattern Pf1 and the second frame pattern Pf2) or on the lighting board LCB, partial local density of the micro-structure region MS may also be used to directly change partial recycling amount of light that enters the light guide plate LGP, so as to indirectly change the amount of light that may be guided out by the micro-structure layer MSL of the light guide plate LGP.

Needless to say, the micro-structure layer MSL of the shielding sheet SS is easy to change in design and relatively low in cost. Although the micro-structure layer MSL of the shielding sheet SS is provided to overlap with the first frame pattern Pf1 and the second frame pattern Pf2, it may still contribute to the edge light output of the first outlet window OW1 and the second outlet window OW2. At the junction of the first outlet window OW1 and the first frame pattern Pf1, and near the junction of the second outlet window OW2 and the second frame pattern Pf2, the micro-structure layer MSL of the shielding sheet SS may reflect the escaped light of the illuminant LED corresponding to the two keyswitches KS1/KS2 back to the light guide plate LGP and change the direction partially (toward the inner illuminant LED). This is because the diffusion range of the micro-structure layer MSL is actually nearly hemispherical. Therefore, light originally away from the inner illuminant LED may return to the first outlet window OW1 and the second outlet window OW2 from below the first frame pattern Pf1 and the second frame pattern Pf2 to emit light.

As mentioned in the above, the light adjacent to the keyswitch KS may be transmitted to the bottom of the keyswitches KS1/KS2 through the light guide plate LGP. If the light from the outer illuminant LED adjacent to the keyswitch KS escapes at the place overlapping with the first frame pattern Pf1 and the second frame pattern Pf2, it is also possible to control the amount of light that returns to the light guide plate LGP by adjusting the micro-structure layer MSL of the shielding sheet SS, so as to adjust the amount of light that may be output at the boundary between the first light outlet window OW1 and the second outlet window OW2, and finally contribute to the uniformity of the halo.

The embodiments of the invention refer to the micro-structure region MS/LMS and the inner/outer micro-structure region IMS/OMS, both of which are regions formed by a plurality of micro-structures. In practice, any micro-structure region MS, frame micro-structure region FMS and inner/outer micro-structure region IMS/OMS may be selectively integrated in one or more micro-structure layers MSL. For example, in FIGS. 2 to 11, the micro-structure layer MSL (first layer) may comprise inner/outer micro-structure regions IMS/OMS that are simultaneously disposed on the first reflective layer RL1 of the lighting board LCB. In FIG. 13D, the micro-structure layer MSL (second layer) may dispose the frame micro-structure region FMS on the shielding sheet SS. If necessary, the micro-structure layer MSL (third layer, omitted and not shown) may be disposed on the light guide plate LGP, for example, it may comprise several micro-structure regions LMS (see FIG. 3) corresponding to the frame micro-structure region FMS of the shielding sheet SS and the inner/outer micro-structure region IMS/OMS of the first reflective layer RL1 of the lighting board LCB respectively. Needless to say, the first reflective layer RL1 on the lighting board LCB may also be regarded as a linear micro-structure region MS of the micro-structure layer MSL on the lighting board LCB because of the concave-convex structure caused by covering the traces HT/LT/STa/STb.

As mentioned in the above, the embodiments of the invention shown in FIGS. 12A to 14B arranges the frame pattern/block pattern of the shielding sheet in an optimal manner and simultaneously utilizes the micro-structure layer from different positions to recycle light, thereby improving the problem of uneven halo in some areas, so as to improve the contour halo uniformity of plural areas and take into account the halo uniformity of a single key in the areas.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module configured to illuminate a plurality of key caps, the backlight module comprising:
   a lighting board comprising a plurality of illuminants aligned into two rows; and
   a shielding sheet comprising:
      a plurality of first outlet windows;
      a plurality of first block patterns disposed within the plurality of first outlet windows respectively, each of the first block patterns respectively corresponding to one of the illuminants, the first block patterns forming a first row pattern;
      at least one second outlet window; and
      a plurality of second block patterns disposed within the at least one second outlet window, each of the second block patterns respectively corresponding to one of the illuminants, the second block patterns forming a second row pattern;
   wherein the lighting board further comprises a pair of non-intersecting traces passing through the plurality of first outlet windows, and the first row pattern is at least partially located between the pair of non-intersecting traces.

2. The backlight module of claim 1, wherein the plurality of first outlet windows have identical areas.

3. The backlight module of claim 1, wherein the second outlet window and each of the plurality of first outlet windows have different areas.

4. The backlight module of claim 1, wherein short sides of each of the plurality of first outlet windows and the second outlet window are equal in length.

5. The backlight module of claim 1, wherein the at least one second outlet window comprises a plurality of second outlet windows; two of the plurality of second outlet windows located at relatively outer sides are identical to two of the plurality of first outlet windows located at relatively outer sides.

6. The backlight module of claim 1, wherein a first window length of an entire contour of the plurality of first outlet windows is as long as a second window length of the at least one second outlet window.

7. The backlight module of claim 1, wherein two of the plurality of second block patterns located at relatively outer sides and two of the plurality of first block patterns located at relatively outer sides correspond to each other in shape and position.

8. The backlight module of claim 1, wherein the backlight module comprises a light guide plate and at least one micro-structure layer, and the micro-structure layer is located on a surface of at least one of the shielding sheet, the light guide plate and the lighting board.

9. The backlight module of claim 1, wherein the backlight module comprises at least one micro-structure layer, the shielding sheet comprises a second frame pattern, the second frame pattern corresponds to the second outlet window and the second row pattern, and the micro-structure layer overlaps with at least one part of the second frame pattern.

10. The backlight module of claim 1, wherein the second outlet window further comprises at least one frame rib, and the frame rib has at least one second supplementary light window.

11. The backlight module of claim 1, wherein at least one of the first block patterns is identical to at least one of the second block patterns.

12. The backlight module of claim 1, wherein four corners of an entire contour of the plurality of first outlet windows are symmetrical to four corners of the at least one second outlet window.

13. The backlight module of claim 1, wherein the second block patterns are divided into a first group and a second group, and a number of the second group of second block patterns far away from the plurality of first outlet windows is larger than a number of the first group of at least one second block pattern close to the plurality of first outlet windows.

14. A lighting keyboard comprising:
   at least one first keyswitch;
   at least one second keyswitch arranged parallel to the at least one first keyswitch; and
   a backlight module comprising:
      a lighting board comprising a plurality of illuminants corresponding to the at least one first keyswitch and the at least one second keyswitch; and
      a shielding sheet comprising:
         a plurality of first outlet windows;
         a plurality of first block patterns disposed within the plurality of first outlet windows respectively, each of the first block patterns respectively corresponding to one of the illuminants, the first block patterns forming a first row pattern;
         at least one second outlet window; and
         a plurality of second block patterns disposed within the at least one second outlet window, each of the second block patterns respectively corresponding to one of the illuminants, the second block patterns forming a second row pattern;
   wherein the lighting board further comprises a pair of non-intersecting traces passing through the plurality of first outlet windows, and the first row pattern is at least partially located between the pair of non-intersecting traces.

15. A lighting board comprising:
   a plurality of illuminants aligned into two rows;
   a first pair of non-intersecting traces;
   a second pair of non-intersecting traces; and
   a shielding sheet comprising:
      a plurality of first outlet windows;
      a plurality of first block patterns disposed within the plurality of first outlet windows respectively, each of the first block patterns respectively corresponding to one of the illuminants, the first block patterns forming a first row pattern;
      at least one second outlet window; and
      a plurality of second block patterns disposed within the at least one second outlet window, each of the second block patterns respectively corresponding to one of the illuminants, the second block patterns forming a second row pattern;
   wherein the first row pattern is located between the first pair of non-intersecting traces passing through the plurality of first outlet windows, the second row pattern is located between the second pair of non-intersecting traces, and the first row pattern is different from the second row pattern.

* * * * *